United States Patent

Inoue et al.

[11] Patent Number: 6,014,599
[45] Date of Patent: Jan. 11, 2000

[54] TIRE ABNORMALITY SENSOR

[75] Inventors: Yuichi Inoue, Tajimi; Takeyasu Taguchi, Obu, both of Japan

[73] Assignee: Denso Corporation, Kariya, Japan

[21] Appl. No.: 08/919,471

[22] Filed: Aug. 28, 1997

[30] Foreign Application Priority Data

Aug. 29, 1996 [JP] Japan .................................. 8-248999
Aug. 29, 1996 [JP] Japan .................................. 8-249000

[51] Int. Cl.$^7$ .................................................. B60C 23/00
[52] U.S. Cl. ............................ 701/29; 702/147; 324/178
[58] Field of Search ............................ 701/29; 340/442, 340/443, 444; 702/145, 146, 147, 148; 324/161, 178, 179

[56] References Cited

U.S. PATENT DOCUMENTS 4,532,493  7/1985  Sibeud ..................................... 340/448
5,541,859  7/1996  Inoue et al. ............................. 364/565

FOREIGN PATENT DOCUMENTS 0466535   1/1992   European Pat. Off. .
636 503    2/1995   European Pat. Off. .
657 313    6/1995   European Pat. Off. .
4-232107   8/1992   Japan .
6-308139  11/1994   Japan .

Primary Examiner—Michael J. Zanelli
Attorney, Agent, or Firm—Pillsbury Madison and Sutro, LLP

[57] ABSTRACT

To achieve both accuracy in correcting sensing error caused by nonstandard factors of a pulse signal generated by rotation of a rotor to be measured and reduction in cost of an apparatus for doing the same, each passage of rotor sensors which rotate integrally with vehicle tires are sensed to produce pulse signals. The pulse signal periods are sequentially integrated every pulse signal train consisting of multiple pulse signals. When all of the pulse signal periods of the pulse signal train are integrated, the integrated value is stored in memory. The memory always stores the integrated values of the newest one rotation of the rotor to be measured. The pulse signal periods are averaged from the sum of the integrated values. With such a construction, the average of the pulse signal periods can be obtained as a learning reference value in the correction without storing all of the pulse signal periods of one rotation, thereby realizing both correction accuracy and cost reduction.

7 Claims, 15 Drawing Sheets

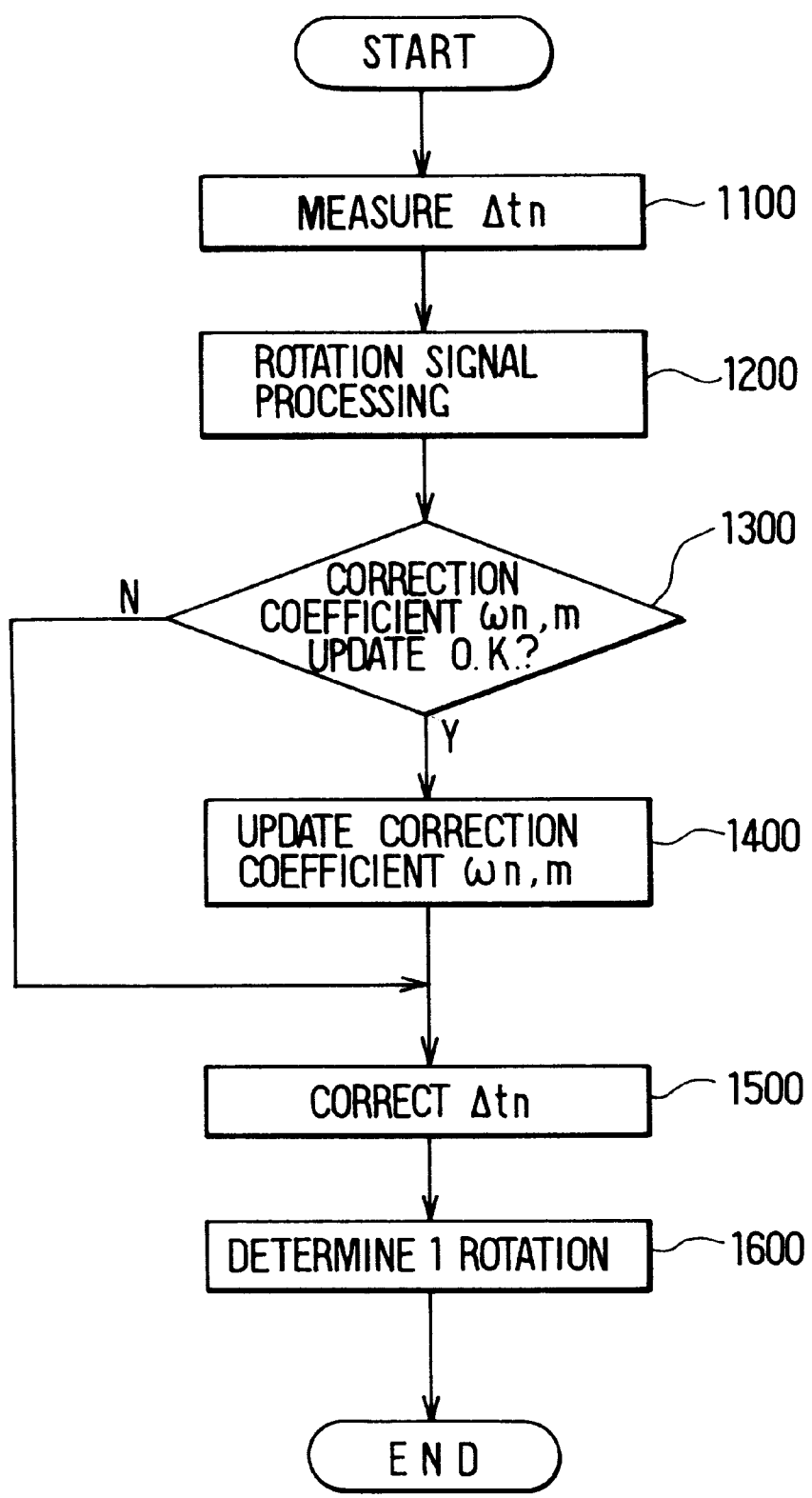

48 MOST RECENT PULSES

PULSE SIGNAL NOT YET INPUT

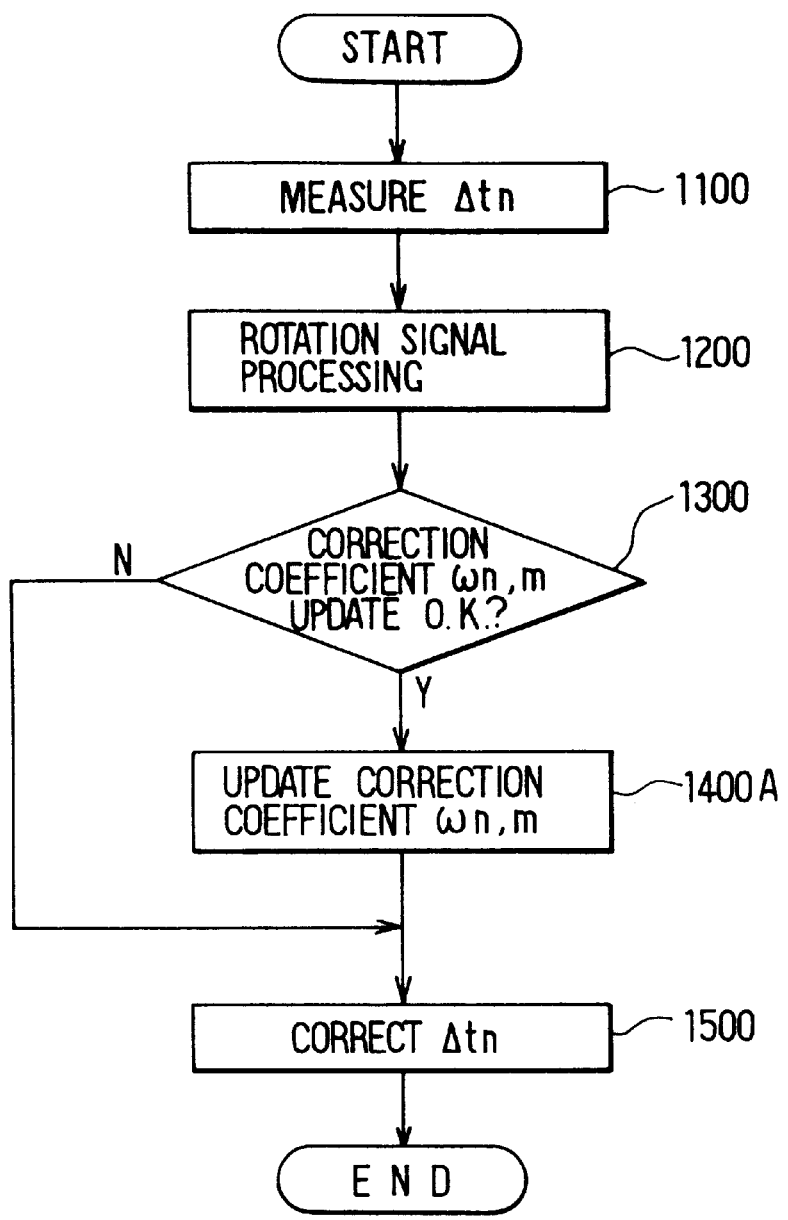

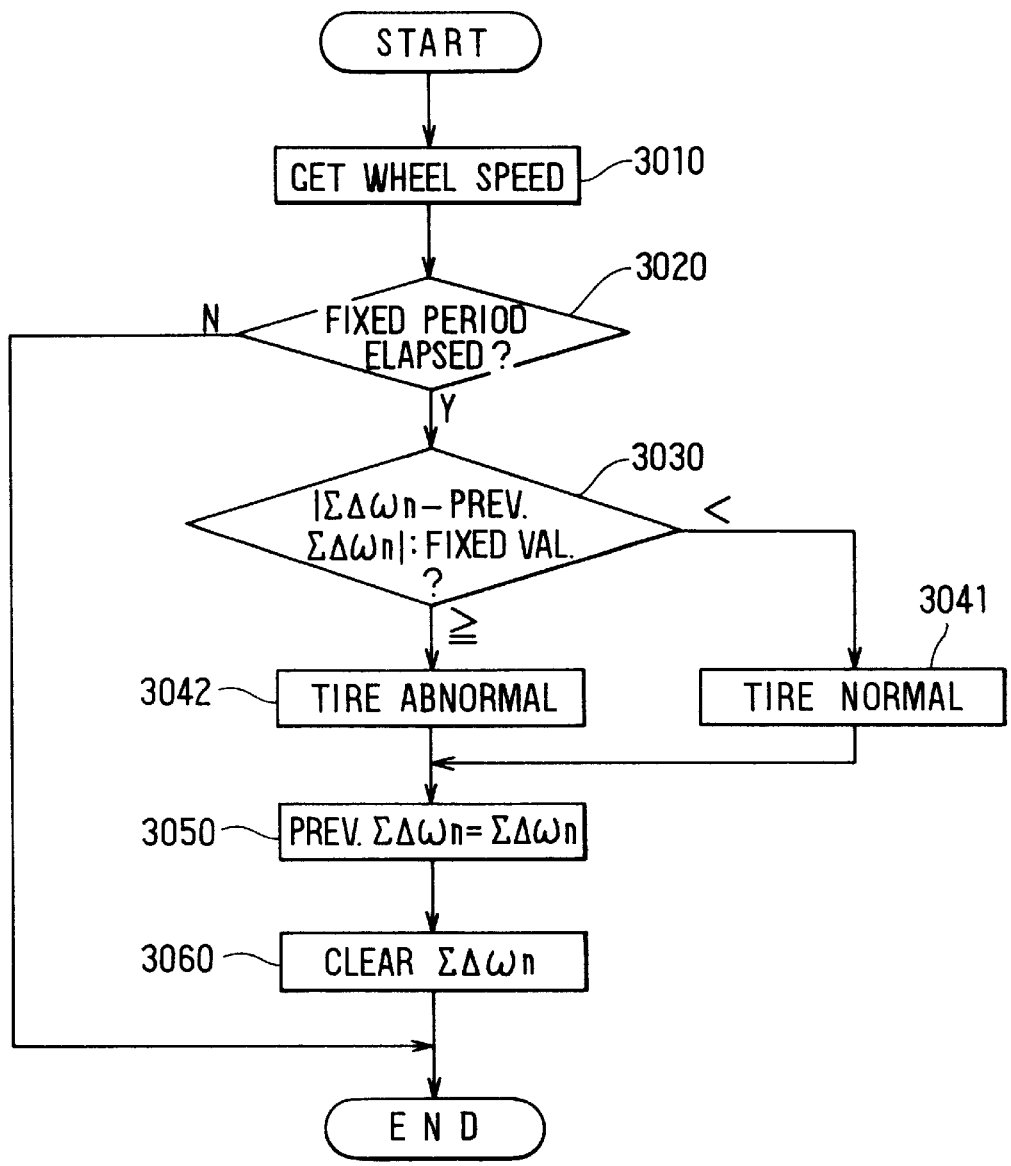

TIRE ABNORMALITY SENSOR

CROSS-REFERENCE TO RELATED APPLICATIONS

This application is related to Japanese Patent Application Nos. Hei 8-248999 and 8-249000, incorporated herein by reference.

BACKGROUND OF THE INVENTION

1. Field of the Invention

The present invention relates to a tire abnormality sensor for sensing abnormality of tires of a vehicle.

2. Description of Related Art

A tire abnormality sensor is an apparatus for monitoring the state of tires during drive, sensing abnormality such as deflation, and notifying a driver or the like of the abnormality. As a technique of sensing the tire state, other than a conventionally-known technique of sensing tire pressure or temperature in a tire, there is a technique in which attention is paid to the fact that the tire radius is changed when the tire is deflated, and an angular velocity of a wheel is sensed. As a method using such a technique of sensing the tire state, Japanese Patent Laid-Open Publication No. Hei 4-232107 discloses a method of sensing the deflation of a tire by calculating a linear function of the difference between the squares of the angular velocities of a pair of first and second wheels.

Hitherto, a rotational speed sensing mechanism for sensing speed of a rotor has a signal rotor which rotates integrally with the rotor. A number of pulse signals are successively generated from electromagnetic pickups or the like in association with the rotation. An electronic control unit (ECU) receives the pulse signals and calculates the speed of the rotor on the basis of the number of pulse signals per unit time or pulse signal periods. However, the pulse signals are not constant due to nonstandard factors such as manufacturing error, corrosion, deformation during drive or the like of the signal rotor. It is, therefore, necessary to correct the sensing error of each pulse signal which is caused by the nonstandard factors. Japanese Patent Publication Laid-Open No. Hei 6-308139 discloses a rotor speed sensor in which the sensing error of the pulse signal due to the nonstandard factors is corrected. According to the rotor speed sensor, the periods of the pulse signals of the newest rotation are stored, the average of the pulse signal periods is sequentially calculated on the basis of the stored pulse signal periods, and a correction coefficient for correcting the pulse signal period is updated by using the average as a learning reference value, thereby eliminating the sensing errors due to the nonstandard factor.

According to the tire deflation sensing method of Japanese Patent Publication Laid-Open No. Hei 4-232107, however, only whether the tire is deflated can be determined from the linear functions obtained by inputting the angular velocities of the four wheels. Detailed information on the tire in which abnormality occurred, for example, whether the deflated tire is on the front or rear side cannot be obtained.

According to the rotor speed sensor disclosed by Hei 6-308139, although the sensing error caused by the nonstandard factor can be almost eliminated, since calculation scale in the ECU is large, an ECU having high processing ability is required. Consequently, an ECU having large memory capacity or which can perform a high-speed process is necessary.

SUMMARY OF THE INVENTION

In view of the above problems of the prior art, it is an object of the present invention to provide a tire abnormality sensor which can obtain not only information of occurrence of tire abnormality but also detailed information of a tire in which abnormality occurred.

It is another object of the present invention to provide a rotor speed sensor with high sensing precision which does not need a large memory capacity or high processing speed to realize a reduction in cost.

The above objects are achieved according to a first aspect of the present invention by providing a tire abnormality sensor which includes a rotor which rotates integrally with a wheel and in which a plurality of rotation elements are formed in the circumferential direction, a rotation sensing device which faces the rotor and senses passage of each of the rotation elements of the rotor, a deviation dependent value calculating device for calculating a deviation dependent value which is dependent on a deviation in sensing periods of sensing signals produced by the rotation sensing device from a reference value, a characteristic variable calculating device for calculating a characteristic variable showing characteristics of the deviation dependent value, and a discriminating device for discriminating between two tire states on the basis of the characteristic variable calculated by the characteristic variable calculating device.

Preferably, the characteristic variable is a variation amount in the deviation dependent values in one rotation of the rotor or an aging change amount in the deviation amount dependent value. Further, it is preferable that the discriminating device is for comparing the difference in the characteristic variables with a predetermined value between wheels. Additionally, it is preferable that the discriminating device compares the difference between the characteristic variables of a present time and a previous time with a predetermined value or that it compares the difference between the characteristic variable of a present time and a preset initial value of the characteristic variable with a predetermined value.

Further, the initial value of the characteristic variable may be a value calculated by the characteristic variable calculating device at a tire normal time, and the discriminating device may storing device for storing the calculated value.

The above objects are achieved according to a second aspect of the present invention by providing a rotor speed sensor for correcting a sensing error caused by a nonstandard factor of a rotor to be measured in successive pulse signals generated by one rotation of the rotor to be measured by using a correction coefficient, and for calculating speed of the rotor to be measured on the basis of the corrected pulse signals, where the sensor includes a correction coefficient updating device for updating the correction coefficient, the correction coefficient updating device having a learning reference value calculating device for calculating a learning reference value dependent on the average of periods of the pulse signals, a deviation dependent value calculating device for calculating a value dependent on the deviation between each of the pulse signal periods corrected by the correction coefficient which was calculated a previous time and the learning reference value, and a correction coefficient calculating device for calculating the correction coefficient of a present time by adding the deviation dependent value calculated by the deviation dependent value calculating device and the correction coefficient which was calculated a previous time; where the learning reference value calculating device has an integrating device for sequentially integrating pulse signal periods every pulse signal train consisting of a predetermined number of successive pulse signals, a storing device to which an integrated value obtained by integrating all of the pulse signal periods in the pulse signal train by the integrating device is written and the newest integrated value of one rotation of the rotor to be measured is always stored, and an average calculating device for summing up the integrated values stored in the storing device and calculating an average of the pulse signal periods from the sum; and the predetermined number is a divisor which is an integer of 2 or larger by which the number of pulse signals of one rotation of the rotor to be measured are divided.

The above objects are achieved according to a third aspect of the present invention by providing a rotor speed sensor for correcting a sensing error caused by a nonstandard factor of a rotor to be measured in multiple successive pulse signals generated for one rotation of the rotor to be measured by using a correction coefficient and for calculating the speed of the rotor to be measured on the basis of the corrected pulse signals, the sensor including a correction coefficient updating device for updating the correction coefficient, the correction coefficient updating device including a learning reference value calculating device for calculating a learning reference value dependent on the average of periods of the pulse signals, a deviation dependent value calculating device for calculating a value dependent on the deviation between each of the pulse signal periods corrected by the correction coefficient which was calculated a previous time and the learning reference value, and a correction coefficient calculating device for calculating the correction coefficient of a present time by adding the deviation dependent value calculated by the deviation dependent value calculating device and the correction coefficient which was calculated the previous time; where the learning reference value calculating device has a storing device to which the pulse signal period is written each time the pulse signal is inputted so that a predetermined number of newest pulse signal periods are always stored, and an average calculating device for calculating an average of the predetermined number of pulse signal periods stored in the storing device; and the predetermined number is a number which is set on the basis of periodicity of the nonstandard factor of the rotor to be measured.

The above objects are achieved according to a fourth aspect of the present invention by providing a rotor speed sensor for correcting a sensing error caused by a nonstandard factor of a rotor to be measured in multiple successive pulse signals generated for one rotation of each one of a plurality of rotors which rotate at almost the same rotational speed by using a correction coefficient and for calculating the speed of the rotor to be measured on the basis of the corrected pulse signal, the sensor including a correction coefficient updating device for updating the correction coefficient, the correction coefficient updating device including a learning reference value calculating device for calculating a learning reference value dependent on the average of periods of the pulse signals, a deviation dependent value calculating device for calculating a value dependent on the deviation between each of the pulse signal periods corrected by the correction coefficient which was calculated a previous time and the learning reference value, and a correction coefficient calculating device for calculating the correction coefficient of a present time by adding the deviation dependent value calculated by the deviation dependent value calculating device and the correction coefficient which was calculated the previous time; where the learning reference value calculating device includes an average speed calculating device for calculating the average, among the rotors to be measured, of the speeds of the rotors to be measured which were calculated a previous time, and a converting device for converting the average calculated by the average speed calculating device into a representative value of the pulse signals; and the representative value is used as the learning reference value.

The above objects are achieved according to a fifth aspect of the present invention by providing a rotor speed sensor for correcting a sensing error caused by a nonstandard factor of a rotor to be measured in multiple pulse signals successively generated by one rotation of the rotor to be measured by using a correction coefficient and for calculating speed of the rotor to be measured on the basis of the corrected pulse signals, the sensor including a correction coefficient updating device for updating the correction coefficient, the correction coefficient updating device including a learning reference value calculating device for calculating a learning reference value dependent on the average of periods of the pulse signals, a deviation dependent value calculating device for calculating a value dependent on the deviation between each of the pulse signal periods corrected by the correction coefficient which was calculated a previous time and the learning reference value, and a correction coefficient calculating device for calculating the correction coefficient of this time by adding the deviation dependent value calculated by the deviation dependent value calculating device and the correction coefficient which was calculated a previous time; where one of pulse signal trains each consisting of a predetermined number of successive pulse signals commonly uses a group of correction coefficient for converting the pulse signals with other pulse signal trains, the correction coefficient updating device is for updating the correction coefficient each time the pulse signal commonly using the correction coefficient is inputted, and the predetermined value is a divisor which is an integer of 2 or larger by which the number of pulse signals of one rotation of the rotor to be measured is divided.

The above objects are achieved according to a sixth aspect of the present invention by providing a rotor speed sensor for correcting a sensing error caused by a nonstandard factor of a rotor to be measured in multiple pulse signals successively generated for one rotation of the rotor to be measured by using a correction coefficient and for calculating speed of the rotor to be measured on the basis of the corrected pulse signals, the sensor including a correction coefficient updating device for updating the correction coefficient, the correction coefficient updating device including a learning reference value calculating device for calculating a learning reference value dependent on the average of periods of the pulse signals, a deviation dependent value calculating device for calculating a value dependent on the deviation between each of the pulse signal periods corrected by the correction coefficient which was calculated a previous time and the learning reference value, and a correction coefficient calculating device for calculating a correction coefficient of a present time by adding the deviation dependent value calculated by the deviation dependent value calculating device and the correction coefficient which was calculated the previous time; where the correction coefficient updating device is for using a value dependent on one of periods of a predetermined number of pulse signals and the average of periods of a pulse signal train consisting of a predetermined number of successive pulse signals as a learning reference value, and the predetermined value is a divisor by which the number of pulse signals of one rotation of the rotor to be measured is divided.

Other objects and features of the present invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

FIG. 3 is a flowchart explaining the operation of the first embodiment;

FIGS. 10–12 are flowcharts explaining the operation of a tire abnormality sensor according to a second preferred embodiment of the present invention;

DETAILED DESCRIPTION OF THE PRESENTLY PREFERRED EXEMPLARY EMBODIMENTS

Figure 1:
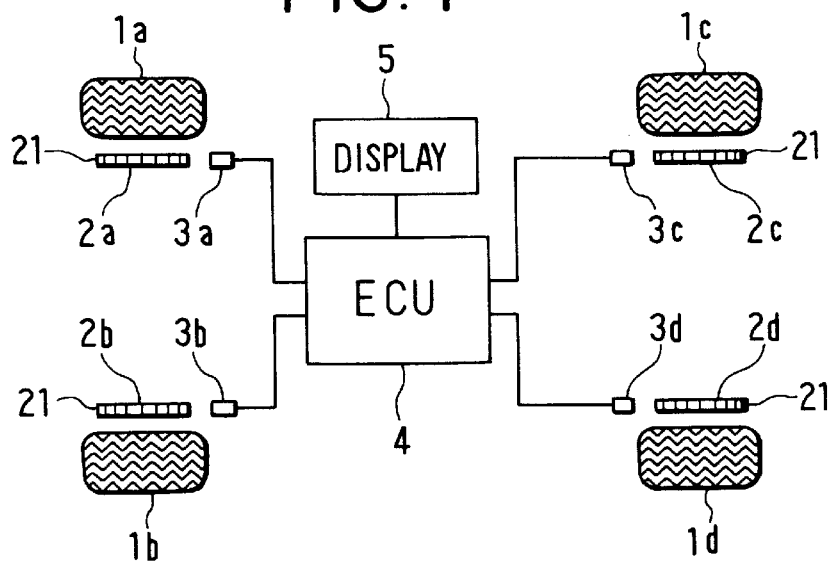
FIG. 1 is a construction diagram of a tire abnormality sensor according to a first preferred embodiment of the present invention.

FIG. 1 shows a tire abnormality sensor according to a first preferred embodiment of the present invention. The tire abnormality sensor according to the first embodiment includes vehicle tires $1a$–$1d$; signal rotors $2a$–$2d$ as rotors which rotate in unison with the tires; and electromagnetic pickups $3a$–$3d$ as rotation sensing devices provided at positions near the outer circumferences of the signal rotors $2a$–$2d$, respectively. Each of the signal rotors $2a$–$2d$ is a toothed wheel on which a number (48 in the embodiment) of teeth 21 made of a magnetic material are formed in the circumferential direction thereof at equal intervals. The teeth 21 function as rotation sensors 21. The electromagnetic pickups $3a$–$3d$ sense a change in the magnetic field which is associated with passage of each of the teeth of the signal rotors $2a$–$2d$ which rotate integrally with the tires $1a$–$1d$, and, for example, each time one of the teeth passes, one sensor signal in a sine wave shape is generated. The sensor signal regarding each of the signal rotors $2a$–$2d$ that is generated from each of the electromagnetic pickups $3a$–$3d$, is supplied to an electronic control unit (ECU) 4.

The ECU 4 includes a waveform shaping circuit to which the sensor signal is supplied and a microprocessor to which an output from the waveform shaping circuit is supplied. The sensor signal in the sine wave shape of each of the signal rotors $2a$–$2d$ is shaped to a pulse signal in a rectangular wave shape by the waveform shaping circuit, and the resultant pulse signal is inputted to the microprocessor. The microcomputer discriminates the presence or absence of the tire abnormality by calculating the rotation state of each of the signal rotors $2a$–$2d$ by using the pulse signals.

A display 5 is connected to the ECU 4. When the tire abnormality is sensed, the driver is notified of the abnormality by an indicator lamp or the like.

The tire abnormality sensor also functions as a wheel speed sensor for sensing the wheel speed of each of the tires $1a$–$1d$. The calculation result of the rotation state of each of the signal rotors $2a$–$2d$ is used for calculating the wheel speed of each of the tires $1a$–$1d$, thereby realizing a reduction in calculation load.

Figure 2:
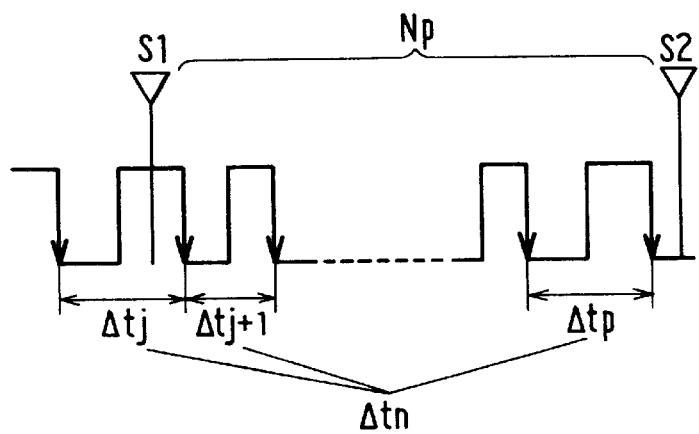
FIG. 2 is a graph of the operation of the first embodiment.

FIG. 2 shows a state of pulse signals that are inputted to the microprocessor in the ECU 4. In the microprocessor, a speed pulse interrupting process is executed in correspondence with a trailing edge of the pulse signal which is used as an interruption signal. In the microprocessor, a periodic interrupting process is performed at times shown by S1, S2, etc.

FIG. 3 shows a flow of the speed pulse interrupting process. First in step 1100, a period $\Delta t_n$ of the pulse signal is measured. The pulse signal period $\Delta t_n$ is obtained by calculating an interval between the trailing edges as interruption signals (FIG. 2) of two successive pulse signals. In step 1200, a rotation sensor number corresponding to each rotation sensor designates each pulse signal. The rotation sensor numbers are numbers from 1 to the number (48 in the first embodiment) of the teeth of each signal rotor, which designate the teeth 21 of each of the signal rotors $2a$–$2d$. That is, the numbers from 1 to 48 corresponding to the rotation sensors are repeatedly designated to the pulse signals, i.e., 1, 2, 3 . . . 46, 47, 48, 1, 2 . . .

Figure 4A:
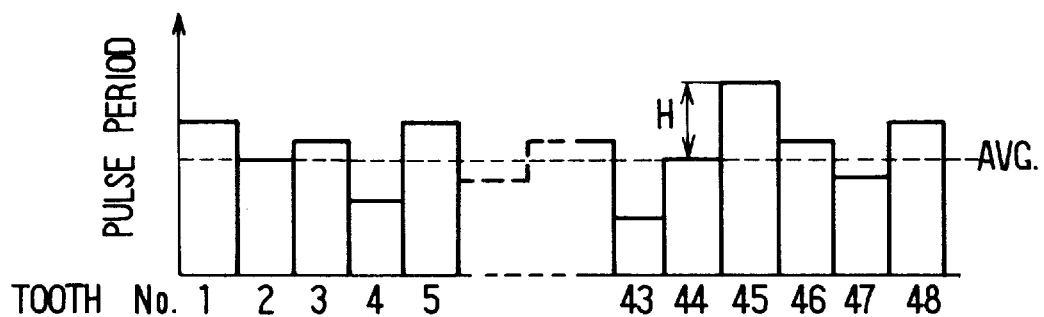
FIGS. 4A and 4B are graphs explaining the operation of the first embodiment.
Figure 4B:
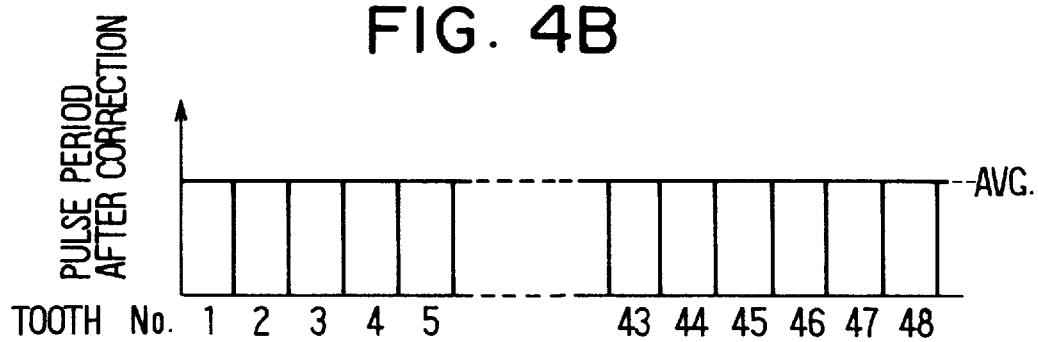

Since a time during which the rotor rotates once is minute, the rotational speed during which the rotor rotates once can be regarded as constant speed. The 48 signal periods in one rotation of the rotor are consequently supposed to be constant. In reality, however, deviation occurs in the pulse signal periods due to the nonstandard factors such as manufacturing error in the rotation sensors of the signal rotors $2a$–$2d$, and tire abnormality such as abrasion or deflation (FIG. 4A). Deviation H between the average of the 48 pulse signal periods and the pulse signal period of each rotation sensor is corrected to be close to zero (FIG. 4B).

Figure 5A:
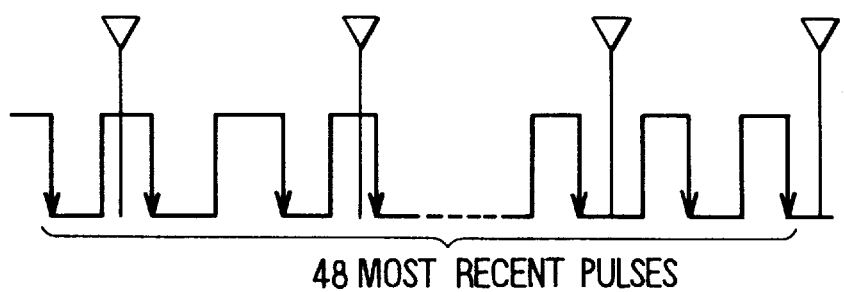
FIGS. 5A and 5B are graphs explaining the operation of the first embodiment.
Figure 5B:
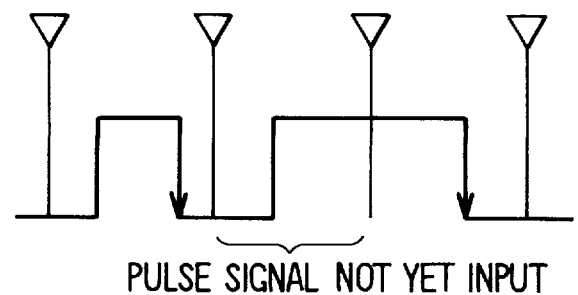

Steps 1300 and 1400 relate to a procedure for updating the correction coefficient as a deviation-dependent value for correcting the deviation of the signal period $\Delta t_n$. In step 1300, with respect to the correction coefficient, permission to update a correction coefficient $\omega_{n,m}$ is discriminated. The suffix letter n denotes the rotation sensor number and the correction coefficients $\omega_{n,m}$ correspond to the rotation sensors 21 of each of the signal rotors $2a$–$2d$ in one-to-one correspondence. The suffix m denotes the number of revolutions of the signal rotor and $\omega_{n,m-1}$ indicates a correction coefficient of the most previous rotation. The correction coefficient $\omega_{n,m}$ is updated on the condition that the newest successive 48 pulse signals are supplied without interruption in a periodic interruption interval (FIG. 5A shows an updatable state and FIG. 5B shows a state which is not updatable). Step 1400 relates to an operation of the deviation-dependent value calculating means.

Figure 6:
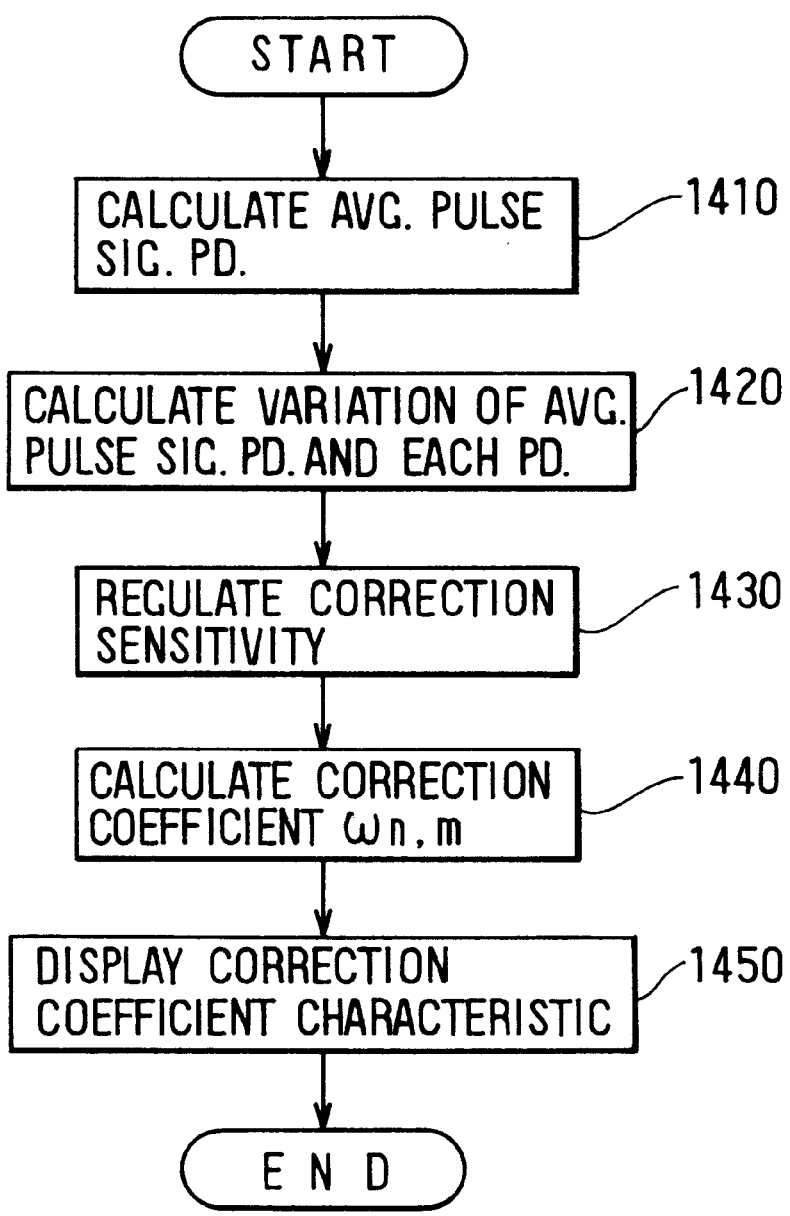
FIGS. 6–9 are flowcharts explaining the operation of the tire abnormality sensor according to the first embodiment.

FIG. 6 shows a procedure for updating the correction coefficient $\omega_{n,m}$ in step 1400. In step 1410, pulse signal periods $\Delta t_k$ (k=n−48, n−47, . . . , n−2, n−1) are read from a memory and an average S of the 48 pulse signal periods of one rotation of the signal rotor is calculated from the read pulse signal periods $\Delta t_n$ by Equation (1) below. The average S of the pulse signal periods is used as a reference of the pulse signal periods $\Delta t_n$ including the sensing error caused by the nonstandard factors.

$$S = \sum_{k=n-1}^{n-48} \Delta t_k \tag{1}$$

In the following step 1420, a deviation dependent value $\Delta t_h$ is calculated according to Equation (2) below. That is, the deviation between the pulse signal period average S and the pulse signal period $\Delta t_n$ of each rotation sensor, which was corrected by the previous correction coefficient $\omega_{n,m-1}$ is calculated (refer to the numerator in Equation (2)), and the deviation is standardized by the average S of the pulse signal periods in order to eliminate speed dependency of the deviation.

$$\Delta t_h = \frac{(S - \omega_{n,m-1} \cdot \Delta t_n)}{S} \tag{2}$$

It is considered that the deviation-dependent value $Dt_h$ shows a deviation of the pulse signal period of each rotation sensor of each of the signal rotors 2a–2d from the reference value. When the vehicle actually drives on a road, however, since the wheel speed fluctuates with random vibrations on the road surface, $\Delta t_h$ also fluctuates at random with every pulse signal input and cannot be a value of each rotation sensor showing the characteristics of each of the signal rotors 2a–2d. In step 1430, by multiplying a correction sensitivity coefficient (k) which adjusts a convergence speed of the correction coefficient $\omega_{n,m}$ with $\Delta t_h$ ($k\Delta t_h$), the degree of influence of $\Delta t_h$ exerted on the correction coefficient $\omega_{n,m}$ for one pulse signal input is adjusted. For example, when the correction sensitivity coefficient (k) is decreased, the fluctuation amount of the correction coefficient $\omega_{n,m}$ can be reduced. With that means, the influence of the random fluctuation of the wheel speed due to the vibration on the road surface exerted on the correction coefficient $\omega_{n,m}$ can be eliminated.

In step 1440, the correction coefficient $\omega_{n,m}$ is updated according to Equation (3) by using the value $k\Delta t_h$ obtained by adjusting the deviation dependent value $\Delta t_h$ with the correction sensitivity coefficient (k). That is, $k\Delta t_h$ is added to the correction coefficient $\omega_{n,m-1}$ of the last time of each rotation sensor. The initial value of the correction coefficient $\omega_{n,m}$ is set to 1 in this case.

$$\omega_{n,m} = \omega_{n,m-1} + k\Delta t_h \tag{3}$$

The above expression denotes that the correction coefficient $\omega_{n,m}$ corresponding to each rotation sensor is updated each time the rotation sensor passes a non-rotational sensor of each of the electromagnetic pickups 3a–3d, and the correction coefficient convergence value which can correct the error caused by the nonstandard factor corresponding to each rotation sensor at arbitrary speed is obtained.

As mentioned above, the rotation state of each of the signal rotors 2a–2d resulted from not only the work error or the like of the signal rotors 2a–2d but also deflation or the like of the tires 1a–1d is reflected in the correction coefficient. When the tire abnormality occurs, therefore, variation in correction coefficients per rotation becomes larger than that in correction coefficients at the tire normal time, and also, the change with time becomes larger. According to the invention, the variation in the correction coefficients or the change with time is used as a characteristic variable showing the characteristics of the correction coefficient to discriminate between the normality and abnormality of the tire.

Figure 7:
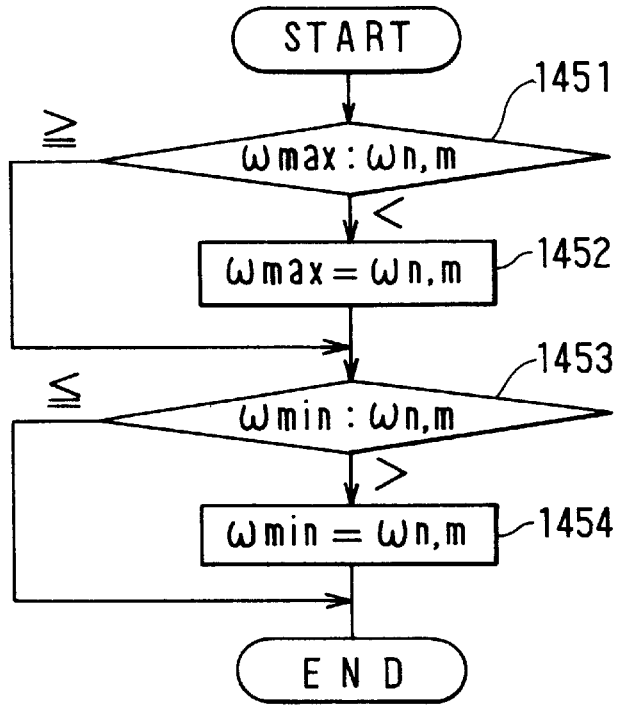

Step 1450 is a step for describing the characteristics of the correction coefficient. FIG. 7 shows a detailed procedure of step 1450. In step 1451, the correction coefficient $\omega_{n,m}$ is compared with a correction coefficient maximum value $\omega_{max}$. When the correction coefficient $\omega_{n,m}$ is larger, it is used as a new correction coefficient maximum value $\omega_{max}$ (step 1452). The initial value of the correction coefficient maximum value $\omega_{max}$ is 0 and is cleared every rotation of each of the signal rotors 2a–2d in step 1600 (FIG. 3) which will be described below. In the following step 1453, the correction coefficient $\omega_{n,m}$ is compared with the correction coefficient minimum value $\omega_{min}$. When the correction coefficient $\omega_{n,m}$ is smaller, it is used as a new correction coefficient minimum value $\omega_{min}$ (step 1454). The initial value of the correction coefficient minimum value $\omega_{min}$ is 0, and is cleared in the above step 1600 in which the correction coefficient maximum value $\omega_{max}$ is cleared. As mentioned above, the correction coefficient $\omega_{n,m}$ is compared with the correction coefficient maximum value $\omega_{max}$ and the correction coefficient minimum value $\omega_{min}$ every speed pulse interrupting process, and the correction coefficient maximum value $\omega_{max}$ and the correction coefficient minimum value $\omega_{min}$ are updated.

In step 1500 in FIG. 3, the pulse signal period $\Delta t_n$ measured in step 1100 is corrected according to Equation (4) below. In the expression, $\Delta t_n'$ denotes a corrected pulse signal period.

$$\Delta t_n' = \Delta t_n \times \omega_{n,m} \tag{4}$$

Figure 8:
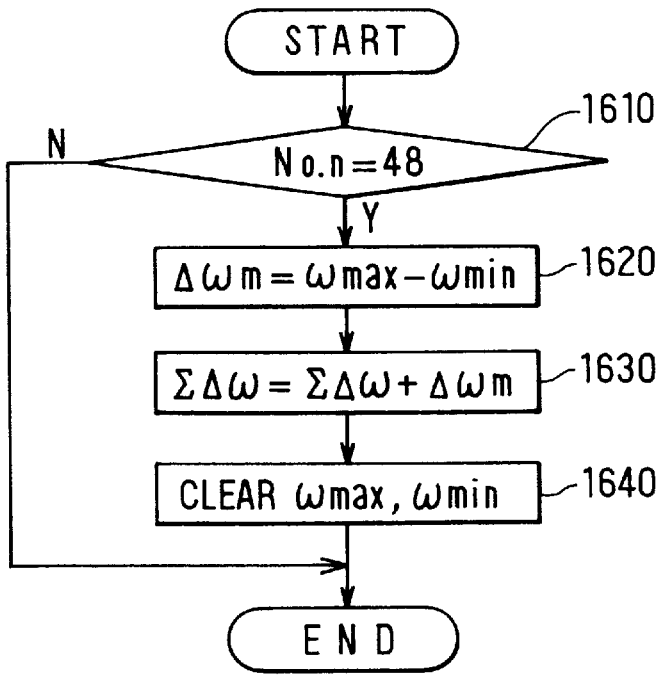

The detailed flow of the following step 1600 is shown in FIG. 8. First, step 1610 determines whether the rotation sensor number is 48 or not. Each time the pulse signal of the rotation sensor number 48 is inputted, that is, every rotation of each of the signal rotors 2a–2d, steps 1620 to 1640 are executed. In step 1620, the difference $\Delta w_m$ between the correction coefficient maximum value $\omega_{max}$ and the correction coefficient minimum value $\omega_{min}$ is calculated by Equation (5) below. Since the correction coefficient maximum value $\omega_{max}$ and the correction coefficient minimum value $\omega_{min}$ are cleared to zero, and after that, updated by the speed pulse interrupting process by the pulse signals of the rotation sensing unit numbers 1 to 48, they are the maximum and minimum values in one rotation of each of the signal rotors 2a–2d. Therefore, the difference $\Delta\omega_m$ shows the variation in the correction coefficients of the signal rotors 2a–2d.

$$\Delta\omega_m = \omega_{max} - \Delta\omega_{min} \tag{5}$$

In step 1630, $\Delta\omega_m$ calculated in step 1620 is added to an integrated value $\Sigma\Delta\omega_m$. In step 1640, the correction coefficient maximum value $\omega_{max}$ and the correction coefficient minimum value $\omega_{min}$ are cleared. Consequently, each time the signal rotors $2a$ to $2d$ rotate once, the variation $\Delta\omega_m$ in the correction coefficient of the rotation is calculated and the integrated value $\Sigma\Delta\omega_n$ is updated. The reason to add $\Sigma\Delta\omega_m$ is to suppress the influence by the vibration on the road surface or the like by the averaging affect.

Figure 9:
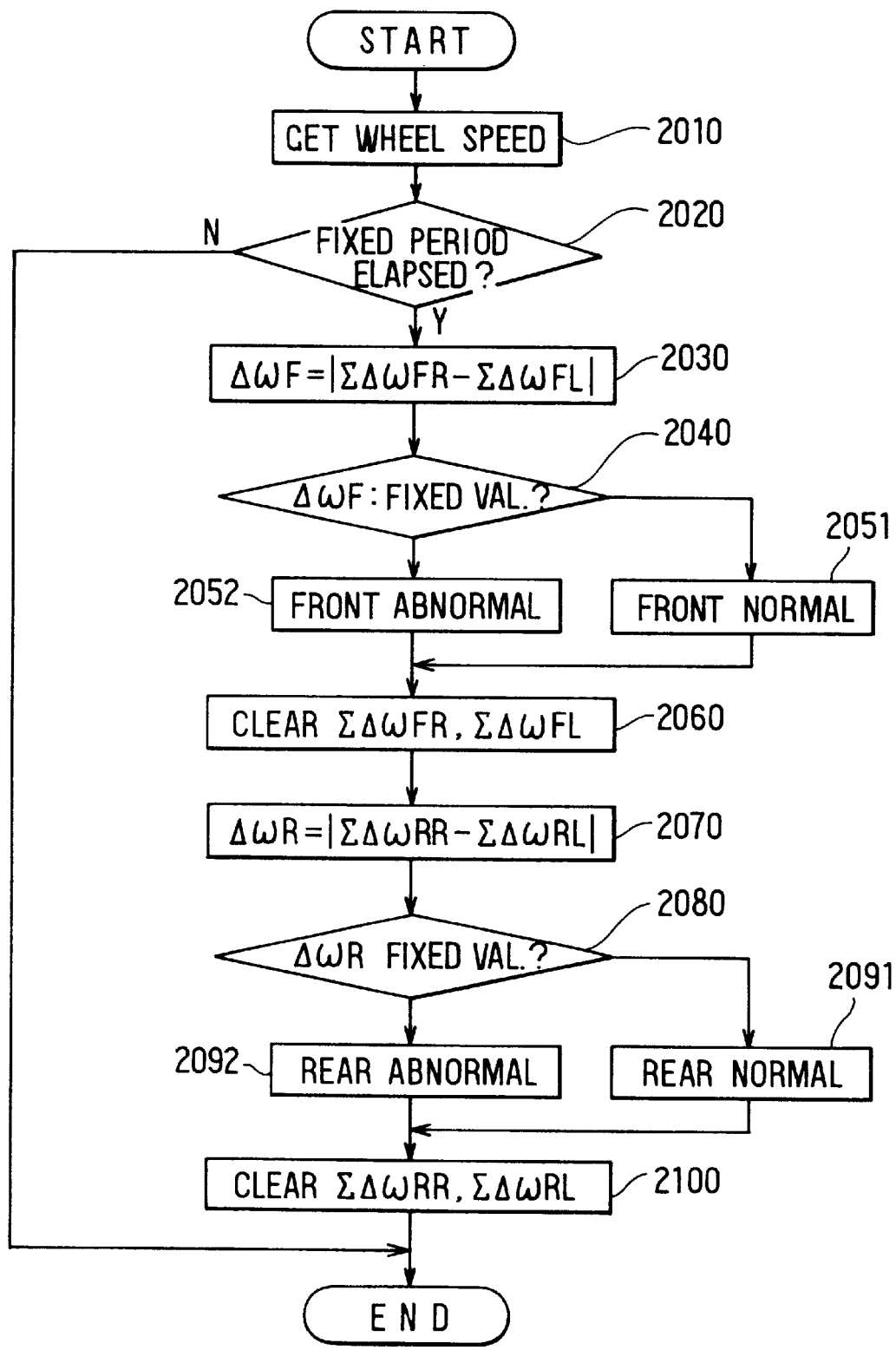

FIG. 9 shows a flow of the periodic interrupt process which is executed every periodic interruption signal of the microprocessor in the ECU 4. The wheel speed is calculated according to Equation (6) below on the basis of the corrected integrated value $\Delta t_s$ of the pulse signal periods, the number $N_p$ of input pulse signals (FIG. 2) in the newest periodic interruption period, and a speed constant (a) determined by the number (48 in this case) of the teeth of each of the signal rotors $2a$–$2d$ and the radius of the wheel (step 2010).

$$V_x = a\frac{N_P}{\Delta t_s} \quad (6)$$

In step 2020, whether a predetermined time has elapsed is discriminated. The predetermined time denotes time specified by the preset number of speed pulse interrupting processes. That is, when the predetermined number of speed pulse interrupting processes are executed, steps 2030 to 2100 are performed. In the description below, the integrated value $\Sigma\Delta\omega_m$ of the variations $\Delta\omega_m$ in the correction coefficients is expressed as follows. That of the right side front tire is expressed as $\Sigma\Delta\omega_{FR}$, that of the left side front tire is expressed as $\Sigma\Delta\omega_{FL}$, that of the right side rear tire is expressed as $\Sigma\Delta\omega_{RR}$, and that of the left side rear tire is expressed as $\Sigma\Delta\omega_{RL}$. In step 2030, the difference $\Delta\omega_F$ between the integrated values $\Sigma\Delta\omega_{FR}$ and $\Sigma\Delta\omega_{FL}$ of the variations $\Delta\omega_m$ of the correction coefficients with respect to the right and left wheels on the front side is calculated according to Equation (7).

$$\Delta\omega_F = |\Sigma\Delta\omega_{FR} - \Sigma\Delta\omega_{FL}| \quad (7)$$

In step 2040, the difference $\Delta\omega_F$ calculated in step 2030 is compared with a predetermined value. The predetermined value is set on the basis of variations in correction coefficients at the time of normality and at the time of occurrence of abnormality which are preliminarily obtained by experiments or the like. When the difference $\Delta\omega_F$ is smaller than the predetermined value, it is determined that the front side tires are normal (step 2051). When the difference $\Delta\omega_F$ is larger than the predetermined value, it is determined that abnormality occurred in the front side tires (step 2052). After the determination, the integrated values $\Sigma\Delta\omega_{FR}$ and $\Sigma\Delta\omega_{FL}$ are cleared (step 2060).

In the following steps 2070 to 2100, the presence or absence of the abnormality of the rear tires is discriminated by the integrated values $\Sigma\Delta\omega_{RR}$ and $\Sigma\Delta\omega_{RL}$ of the variations $\Delta\omega_m$ in the correction coefficients of the rear tires. That is, the difference $\Delta\omega_R$ is calculated according to Equation (8) (step 2070), and the difference $\Delta\omega_R$ is compared with the predetermined value (step 2080), thereby determining the normality or abnormality of the rear side tires in a manner similar to the case of the front side tires (steps 2091, 2092). Subsequently, the integrated values $\Sigma\Delta\omega_{RR}$ and $\Sigma\Delta\omega_{RL}$ are cleared (step 2100).

$$\Delta\omega_R = |\Sigma\Delta\omega_{RR} - \Sigma\Delta\omega_{RL}| \quad (8)$$

In the embodiment, not only the presence or absence of the tire abnormality but also whether the front or rear tires are abnormal can be also specified from the correction coefficients of the four wheels.

Although the differences $\Delta\omega_F$ and $\Delta\omega_R$ are absolute values in the embodiment, a value obtained by subtracting the integrated value of the left tires from that of the right tires can be also used. In this case, whether the right or left tire is abnormal can be discriminated by the sign. It can be also discriminated whether the wheel in which the abnormality occurred is the left or right side wheel by calculating the difference between the integrated values of the variations in the correction coefficients of the front and rear wheels with respect to the right and left sides, respectively. It is also possible that the integrated value of the variations in the correction coefficients of each wheel is independently compared with the predetermined value by which the normality or abnormality can be determined, thereby discriminating between the presence or absence of the abnormality of each wheel. The difference between the integrated values of this time and last time of the variations in the correction coefficients of each wheel may be compared with the predetermined value by which the normality or abnormality can be discriminated.

Although the deviation between the maximum and minimum values of the correction coefficients in one rotation of the signal rotor is used as a variation in the correction coefficients, a statistic serving as an index of the variations, for example, a variance, can be also used.

When the fluctuation in the wheel speed, which is calculated in step 2010 of the periodic interrupting process (FIG. 9), of only the right or left side of either the front or rear wheel is large, it can be also set so that the road surface is discriminated to be rough and the presence or absence of the tire abnormality is not determined. Thus, the precision of the abnormality sensing can be raised. The discrimination of the tire abnormality can be limited in a period when the vehicle drives straight or in a highway area where the possibility that the vehicle drives on a road whose surface is not rough is high.

Second Embodiment

A wheel speed sensor according to a second preferred embodiment of the present invention has a construction substantially the same as that shown in FIG. 1. Mainly the software executed by the microprocessor in the ECU 4 and the like are different. In those Figures, since substantially the same operations are performed with respect to steps designated by the same numbers as those in FIGS. 3 and 6–8 which were referred to in the description of the first embodiment, the different points from the first embodiment will be mainly described here.

Figure 11:
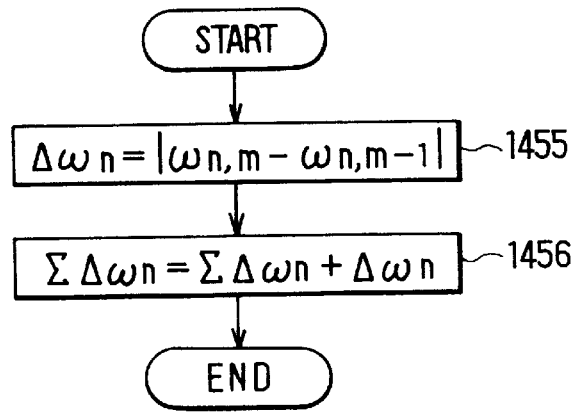

In step 1450A after calculating the correction coefficient (corresponding to step 1440 in FIG. 6), as shown in FIG. 11, an aging change amount $\Delta\omega_n$ of the correction coefficient is calculated according to Equation (9) (step 1455).

$$\Delta\omega_n = |\omega_{n,m} - \omega_{n,m-1}| \quad (9)$$

In the following step 1456, the aging change amount $\Delta\omega_n$ calculated in step 1455 is added to an integrated value $\Sigma\Delta\omega_n$. Consequently, the aging change amount $\Delta\omega_n$ is calculated and the integrated value $\Sigma\Delta\omega_n$ is updated every rotation of each of the signal rotors $2a$–$2d$.

In the periodic interrupting process shown in FIG. 12, the wheel speed is calculated by the same procedure as that of step 2010 in FIG. 9 (step 3010). In step 3020, whether a predetermined time has elapsed or not is determined. The predetermined time denotes time specified by a preset number of speed pulse interrupting processes. That is, when the predetermined number of speed pulse interrupting processes are executed, steps 3030 to 3060 are performed. Steps 3030 to 3060 are performed with respect to each of the tires 1a–1d.

In step 3030, the difference $\Delta(\Sigma\Delta\omega_n)$ is calculated according to Equation (10) and is compared with the preset predetermined value. The predetermined value is set on the basis of the aging change amount of the correction coefficients at the tire abnormal time such as deflation of the tire, which was preliminarily obtained from experiments or the like.

$$\Delta(\Sigma\Delta\omega_n) = |\Sigma\Delta\omega_n - \text{previous } \Sigma\Delta\omega_n| \qquad (10)$$

When the difference $\Delta(\Sigma\Delta\omega_n)$ is smaller than the predetermined value in step 3030, it is determined that the tire is normal (step 3041). When the difference $\Delta(\Sigma\Delta\omega_n)$ is larger than the predetermined value, it is determined that abnormality occurs in the tire (step 3042). After the discrimination, the integrated value $\Sigma\Delta\omega_n$ of the last time is updated to the integrated value $\Sigma\Delta\omega_n$ of the current time (step 3050), and the integrated value $\Sigma\Delta\omega_n$ is cleared (step 3060).

Since the operations are executed on each of the tires 1a–1d in the embodiment, not only the presence or absence of the tire abnormality but also the tire in which the abnormality occurs can be specified.

Although the aging change amount of the correction coefficients of one rotation sensor is used as the characteristic variable in the embodiment, an average of all 48 of the aging change amounts or a part of the rotation sensor can be also used. In this case, when the vehicle is stopped, even if the rotation sensor number cannot be specified, accurate discrimination can be performed.

Although the difference between the integrated value of the aging change amounts of the correction coefficients of the last time and those of the present time is compared with the predetermined value, the difference between the wheels can be also compared in a manner similar to the first embodiment.

Third Embodiment

Figure 13:
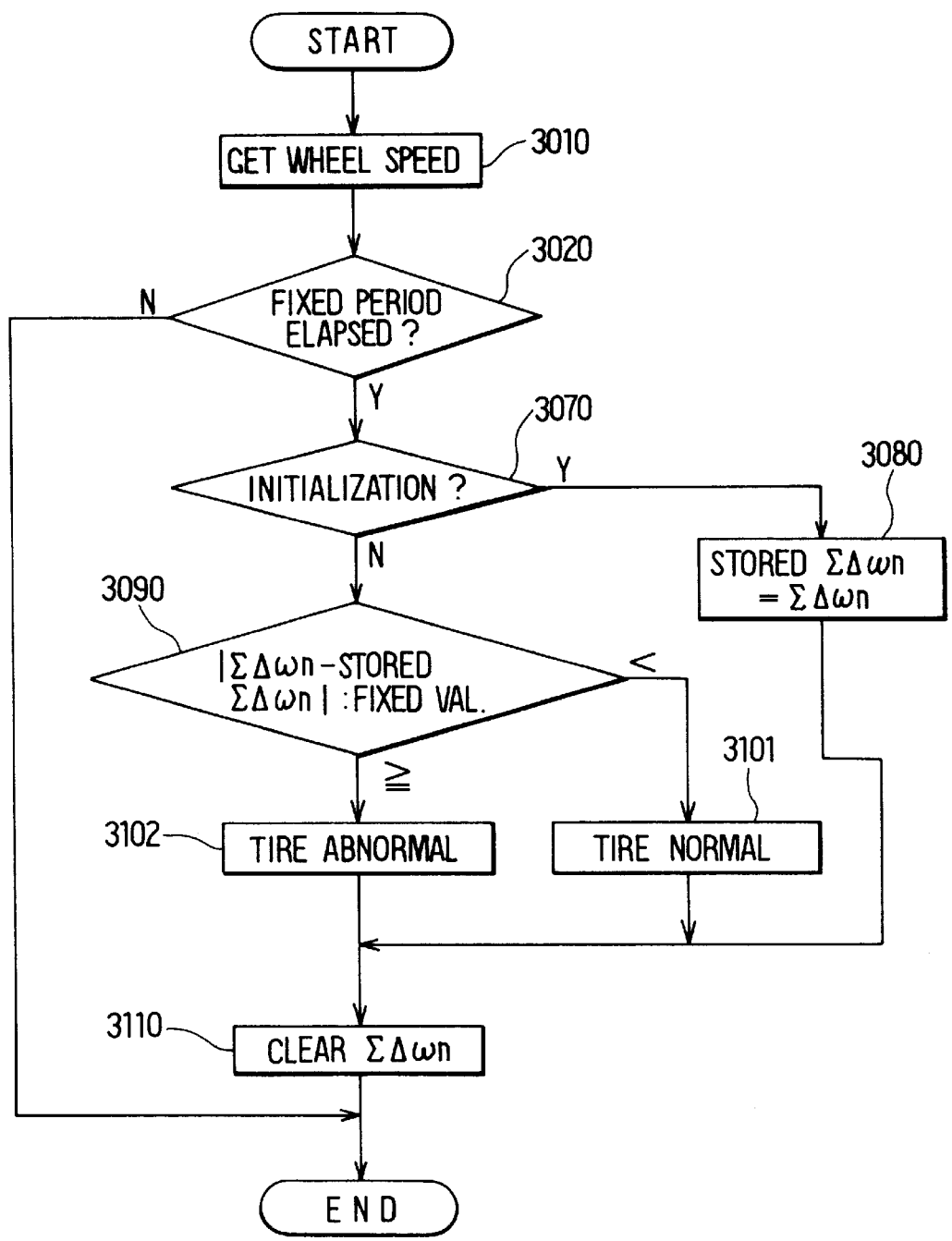
FIG. 13 is a flowchart explaining operation of a tire abnormality sensor according to a third preferred embodiment of the present invention.

In a wheel speed sensor according to a third preferred embodiment of the present invention, the construction and the speed pulse interrupting process are basically the same as those of the second embodiment, but another periodic interrupting process is performed in place of the periodic interrupting process of the second embodiment. FIG. 13 shows a flow of the periodic interrupting process of the embodiment. In the diagram, with respect to steps designated by the same numbers as those in FIG. 12 which were referred to in the description of the first and second embodiments, substantially the same operations are performed. Points different from the second embodiment will be mainly described.

In FIG. 13, whether an initializing operation is executed or not is discriminated in step 3070. The initializing operation is a switch operation performed by a driver or the like and is executed at the tire normal state such as at the time of tire replacement. If the initializing operation has been executed, the processing routine advances to step 3080 and the integrated value $\Sigma\Delta\omega_n$ is set as an integrated value $\Sigma\Delta\omega_n$ to be stored and is stored into a backup memory as storing means. In the subsequent periodic interrupting process, the stored integrated value $\Sigma\Delta\omega_n$ is used to discriminate the tire abnormality.

In step 3090, the difference $\Delta(\Sigma\Delta\omega_n)$ is calculated according to Equation (11) and is compared with the preset predetermined value. The predetermined value is set by an aging change amount of the correction coefficients at the time of occurrence of the tire abnormality such as deflation, that was preliminarily obtained by experiments or the like.

$$\Delta(\Sigma\Delta\omega_n) = |\Sigma\Delta\omega_n - \text{stored } \Sigma\Delta\omega_n| \qquad (11)$$

If the difference $\Delta(\Sigma\Delta\omega_n)$ is smaller than the predetermined value in step 3090, it is discriminated that the tire is normal (step 3101). If the difference $\Delta(\Sigma\Delta\omega_n)$ is larger than the predetermined value, it is discriminated that abnormality occurred in the wheel (step 3102). After the discrimination, the integrated value $\Sigma\Delta\omega_n$ is cleared (step 3110).

In the foregoing embodiments, by integrating the characteristic coefficients, the discrimination error is suppressed. However, if a factor of the discrimination error such as vibration on the road surface is small, it is unnecessary to execute the integrating operation.

Fourth Embodiment

Figure 14:
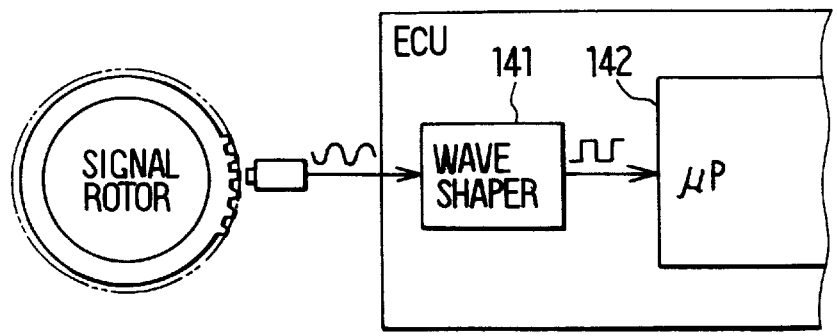
FIG. 14 is a construction diagram of a wheel speed sensor according to a fourth preferred embodiment of the present invention.

FIG. 14 shows a wheel speed sensor to which a fourth preferred embodiment of the present invention is applied. A wheel speed sensing mechanism 11 has a signal rotor 12 which rotates with the wheel of the vehicle, and is provided for every wheel. The signal rotor 12 is implemented using a toothed wheel having a number of teeth (48 in the embodiment) made of a magnetic material around the circumference thereof at equal intervals. The convex and concave parts formed by the teeth on the outer circumference of the signal rotor 12 function as rotation sensors. An electromagnetic pickup 13 is fixedly set to be close to the outer periphery of the signal rotor 12. The electromagnetic pickup 13 senses a change in the magnetic field of the signal rotor which rotates with the wheel in association with passage of each of the teeth. For example, a sensor signal in a sine wave shape is generated for every passage of each of the teeth. That is, the signal rotor 12 rotates with the wheel, thereby generating the sine wave signals which count the teeth from the electromagnetic pickup 13 in association with the passage of each of the teeth of the signal rotor 12. A pickup signal in the sine wave shape is inputted to an ECU 14. The ECU 14 comprises a waveform shaping circuit 141 to which the sine wave pickup signal is supplied and a microcomputer 142 to which an output of the waveform shaping circuit 141 is supplied. A pulse signal having rectangular waves of each wheel is inputted to the ECU 14.

FIG. 10 shows the flow of a speed pulse interrupting process. In step 1100, a period $\Delta t_n$ of the pulse signal is measured. The pulse signal period $\Delta t_n$ is obtained by calculating an interval between trailing edges as interruption signals of two successive pulse signals as shown in FIG. 2. In step 1200, rotation sensor numbers corresponding to the rotation sensors are designated to the pulse signals. The rotation sensor numbers are numbers from 1 to the maximum value (48 in the embodiment) of the teeth designated to the teeth of each of the signal rotors. That is, the numbers from 1 to 48 corresponding to the rotation sensors are repeatedly designated to the pulse signals like 1, 2, 3 . . . 46, 47, 48, 1, 2 . . .

A deviation occurs in the signal periods $\Delta t_n$ due to the nonstandard factors such as deformation of the rotation sensor due to work error, corrosion, or the like of the teeth of the signal rotor, and deformation of the rotor due to abrasion or deformation during drive of the wheel. Steps 1300 and 1400 relate to a procedure for updating a correction coefficient, which will be described below, for correcting the deviation in the signal periods $\Delta t_n$ due to the nonstandard factors. In step 1300, updating permission of the correction coefficient $\omega_{n,m}$ is discriminated. The suffix letter (n) denotes the rotation sensor number and the correction coefficient $\omega_{n,m}$ corresponds to the rotation sensor of each signal rotor in a one-to-one manner. The suffix letter (m) denotes the number of revolution of the signal rotor and $\omega_{n,m-1}$ denotes a correction coefficient of the previous rotation. The correction coefficient $\omega_{n,m}$ is updated on condition that newest successive 48 pulse signals are supplied without interruption in a periodic interruption interval (FIG. 5A shows an updatable state and FIG. 5B shows a state which is not updatable).

Figure 15:
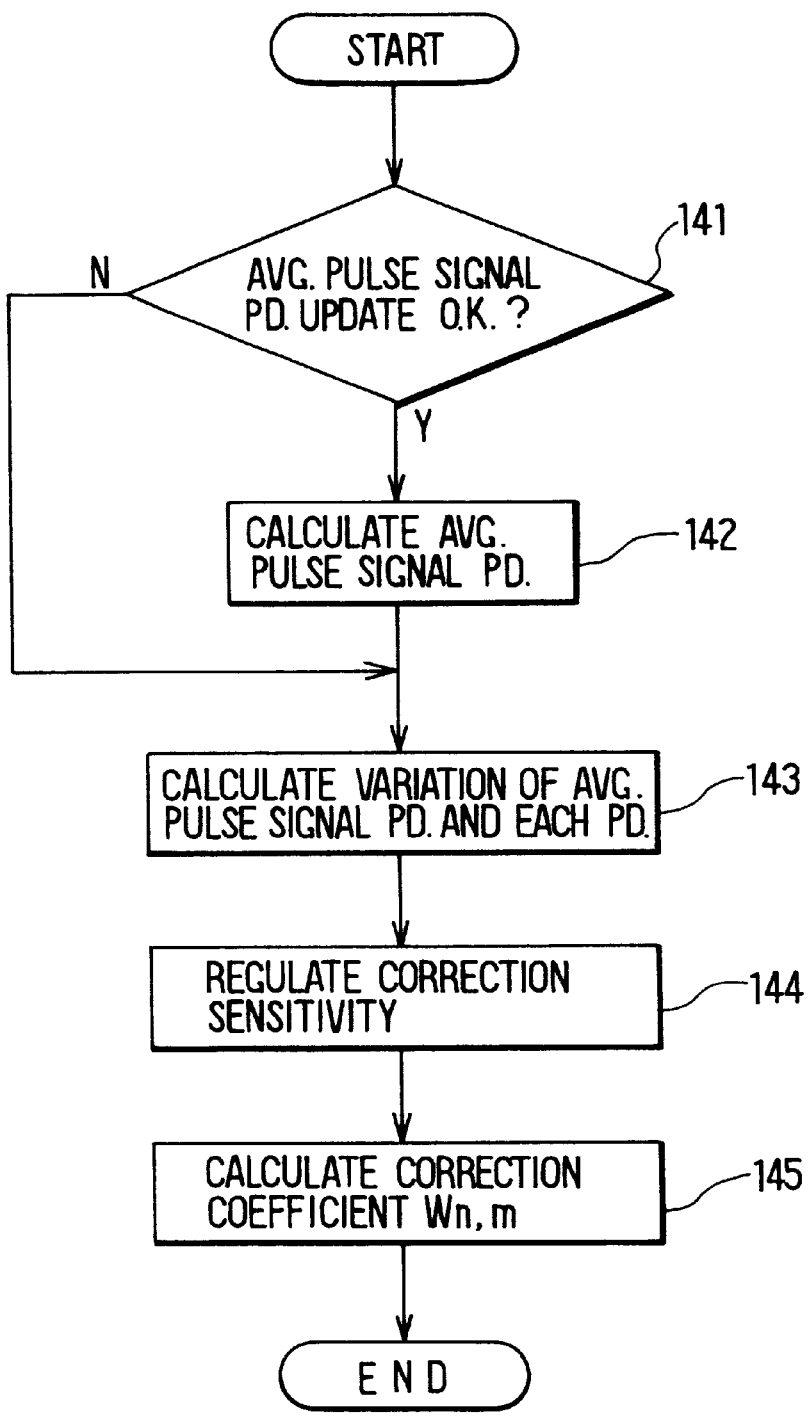
FIG. 15 is a flowchart explaining the operation of the wheel speed sensor according to the fourth embodiment.

In step 1400, the correction coefficient $\omega_{n,m}$ is updated. FIG. 15 shows a procedure for updating the correction coefficient $\omega_{n,m}$. In step 141, whether updating of the average S of the pulse signal periods as a learning reference value is permitted or not is discriminated. The permission to update the average S is issued after completion of the speed pulse interrupting process in each of the pulse signals of the rotation sensor numbers 12, 24, 36, and 48.

When the updating of the pulse signal period average value S is permitted, the processing routine advances to step 142. Step 142 relates to an operation of an average calculating means. First, an integrated value $S_g$ (g=0, 1, 2, 3) of the pulse signal periods $\Delta t_n$ of each pulse signal train is read from a block memory as a storing means. The pulse signal train denotes a predetermined number (12 in the embodiment) of successive pulse signals. The integrated value $S_g$ is an integrated value of the pulse signal periods $Dt_n$ of the pulse signal train consisting of successive pulse signals of the rotation sensor number n (=g×12+1 to g×12+12). The integrated value is calculated in step 1500 which will be described below.

The average S of the 48 pulse signal periods of one rotation of the signal rotor is calculated from the read four integrated values $S_g$ by Equation (12). That is, the average S of the pulse signal periods is obtained by acquiring the sum of the integrated values $S_g$ and dividing the sum by 48 which is the number of the pulse signals of one rotation of the signal rotor.

$$S = \sum_{g=0}^{3} \frac{S_g}{48} \quad (12)$$

Following steps 143 and 144 of FIG. 15 relate to operations of deviation dependent value calculating means. First in step 143, the deviation dependent value $Dt_h$ is calculated by Equation (13). That is, the deviation between the pulse signal period average S and the pulse signal period $Dt_n$ of each rotation sensor corrected by the previous correction coefficient $w_{n,m-1}$ (refer to the numerator in Equation (13)) is calculated, the deviation is standardized by the average S of the pulse signal periods in order to eliminate speed dependency of the deviation.

$$\Delta t_h = \frac{S - \omega_{n,m-1} \Delta t_n}{S} \quad (13)$$

It can be considered that the deviation dependent value $\Delta t_h$ shows a deviation in the pulse signal periods of the rotation sensors due to nonstandard factors of the signal rotor 12. However, when the vehicle actually runs on a road, since the wheel speed fluctuates at random by vibration on the road surface, $\Delta t_h$ also fluctuates at random every pulse signal input so that it cannot be a value of each rotation sensor, which shows characteristics of the signal rotor. In step 144, therefore, by multiplying $\Delta t_h$ with a correction sensitivity coefficient (k) for adjusting convergence speed of the correction coefficient $\omega_{n,m}$ ($k\Delta t_h$), the degree of influence on the correction coefficient $\omega_{n,m}$ of $\Delta t_h$ for one pulse signal input is adjusted. For example, when the value of the correction sensitivity coefficient (k) is decreased, the fluctuation amount of the correction coefficient $\omega_{n,m}$ can be reduced. The influence exerted on the correction coefficient $\omega_{n,m}$ by the random fluctuation of the wheel speed due to the vibration on the road surface can be eliminated with that means.

Step 145 relates to an operation of the correction coefficient calculating means. The correction coefficient $\omega_{n,m}$ is updated by using the value $k\Delta t_h$ obtained by adjusting the deviation dependent value $\Delta t_h$ with the correction sensitivity coefficient (k) in accordance with Equation (14). That is, $k\Delta t_h$ is added to the previous value $\omega_{n,m-1}$ of the correction coefficient of each rotation sensor. The initial value of the correction coefficient $\Delta t_{hn,m}$ is set to 1.

$$\omega_{n,m} = \omega_{n,m-1} + k\Delta t_h \quad (14)$$

The above expression denotes that the correction coefficient $\omega_{n,m}$ corresponding to each rotation sensor is updated each time the rotation sensor passes the non-rotational sensor and the correction coefficient convergence value which can correct the error due to the nonstandard factor corresponding to each rotation sensor at arbitrary speed is obtained. The convergence value shows the ratio of the pulse signal periods when the rotor includes the nonstandard factor to the pulse signals when the rotor includes no nonstandard factor. Since the time of one rotation of the rotor is minute, it is assumed that the rotational speed during which the rotor rotates once is constant. In this case, it is supposed that the 48 pulse signal periods in one rotation of the rotor are inherently constant. However, in reality, variation occurs in the pulse signal periods (refer to FIG. 4A) due to the nonstandard factors such as the work error in the rotation sensors of the signal rotor 12, abrasion of tires, and deformation during drive. By correcting the pulse signal periods by using the correction coefficient, the deviation H of the pulse signal period of each rotation sensor from the average of the 48 pulse signal periods is eliminated so as to be zero (refer to FIG. 4B).

Figure 16A:
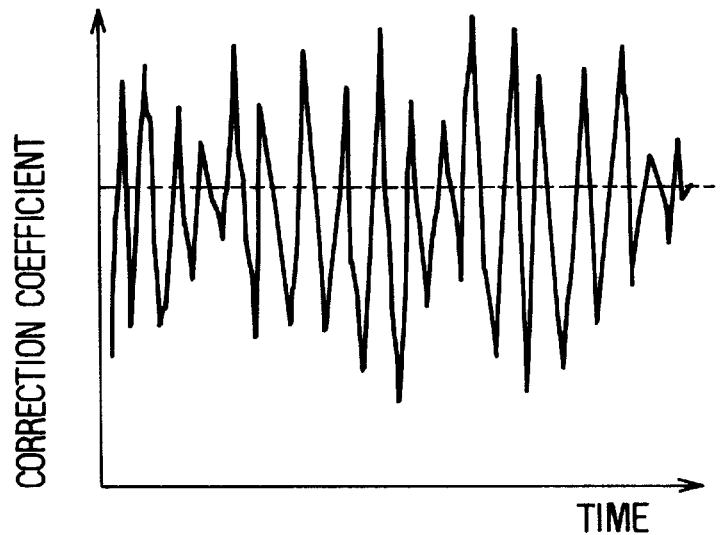
FIGS. 16A and 16B are graphs explaining operation of the wheel speed sensor according to the fourth embodiment.
Figure 16B:
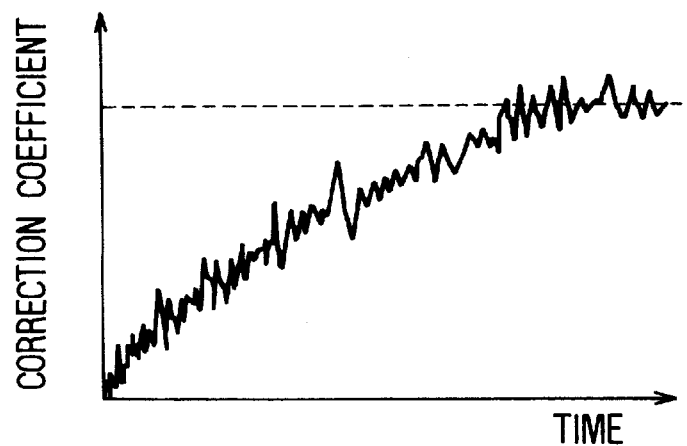

FIGS. 16A and 16B show changes with time of the correction coefficients $\omega_{n,m}$ in both of the cases where the correction sensitivity coefficient (k) is large and small. When the correction sensitivity coefficient (k) is large, although the convergence speed of the correction coefficients $\omega_{n,m}$ is fast, the influence by the vibration on the road surface is easily exerted and fluctuation is large. When the correction sensitivity coefficient (k) is small, although the convergence speed of the correction coefficients $\omega_{n,m}$ is slow, the influence by the vibration on the road surface is not easily exerted and the vibration is small. In an experiment, the wheel was rotated at almost constant speed where (k)=0.008. When the tire was rotated about 500 times (for approximately 35 seconds at 100 km/h and approximately 70 seconds at 50 km/h), the correction coefficients $\omega_{n,m}$ converged to an almost constant value.

Figure 17:
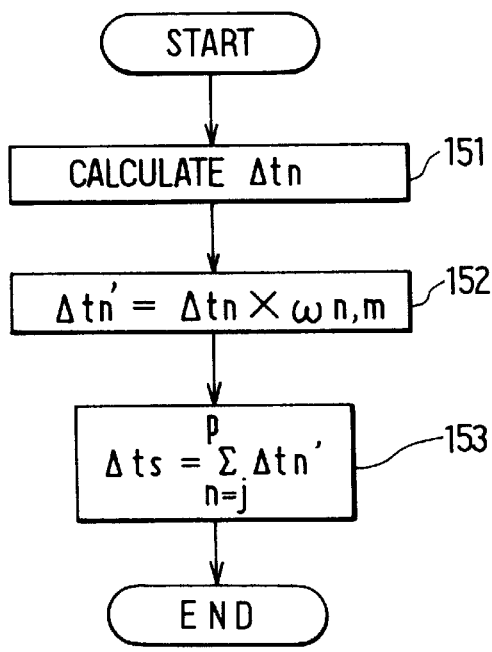
FIGS. 17–20 are flowcharts explaining the operation of the wheel speed sensor according to the fourth embodiment.

In step 1500 of FIG. 10, the calculation error caused by the nonstandard factors in the pulse signal periods $\Delta t_n$ of the signal rotor is corrected. FIG. 17 shows a flow of correction of the pulse signal periods $\Delta t_n$ in step 150. Step 151 relates to an operation of an integrating means and the integrated value $S_g$ is obtained by Equation (15). That is, the periods $\Delta t_n$ of the pulse signals of sensor numbers 1, 13, 25, and 37 as pulse signals at the heads of the pulse signal trains are sequentially integrated every speed pulse interrupting process. When the periods $\Delta t_n$ of the pulse signals of the sensor numbers 12, 24, 36, and 48 as pulse signals at the ends of the pulse signal trains are integrated, the integrated values $S_g$ overwrite a region in the block memory, in which the oldest data is written, and the newest four integrated values $S_g$ (g=0 to 3) are stored. In the expression, (j) denotes the number of pulse signals in the pulse signal train, which is 12 in the embodiment.

$$S_g = \sum_{i=g \cdot j+1}^{g \cdot j+j} \Delta t_i \qquad (15)$$

In step 152, the pulse signal period $\Delta t_n$ is corrected by Equation (16) to eliminate the error caused by the nonstandard factors of the signal rotor 12. In the expression, $\Delta t_n'$ denotes a corrected pulse signal period.

$$\Delta t_n' = \Delta t_n \times \omega_{n,m} \qquad (16)$$

In step 153, the integrated value $\Delta t_s$ of the corrected pulse signal periods $\Delta t_n'$ from the pulse signal period just after the previous periodic interrupting process to the newest pulse signal period is obtained by Equation (17). In the expression, (j) shows the first rotation sensor number in the newest periodic interrupting interval and (p) denotes the newest rotation sensor number. Since the numbers 1 to 48 are repeatedly used as the rotation sensor number (n), j>p may occur.

$$\Delta t_s = \sum_{n=j}^{p} \Delta t_n \qquad (17)$$

Figure 18:
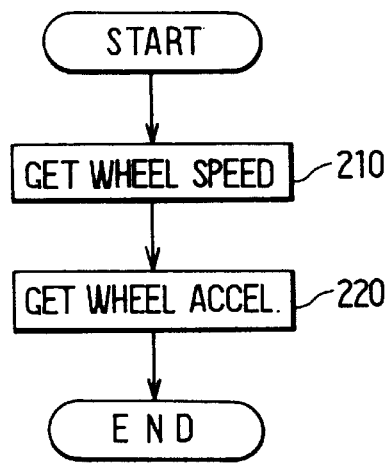
Figure 19:
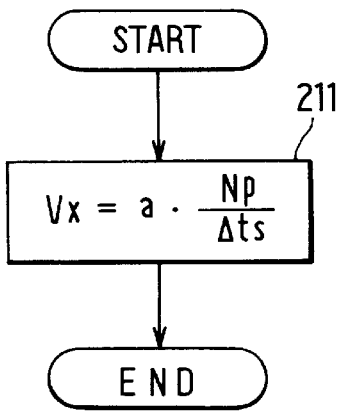

FIG. 18 shows the flow of the periodic interrupting process which is executed every periodic interruption signal of the microprocessor. First, the wheel speed is calculated (step 210). FIG. 19 shows a flow of the wheel speed calculation. Wheel speed $V_x$ is calculated by Equation (18) on the basis of the integrated value $\Delta t_s$ of the corrected pulse signal periods in the newest periodic interruption interval, the number $N_p$ of the input pulse signals in the newest periodic interruption interval (refer to FIG. 2), and speed constant (a) determined by the number (48 in this case) of the teeth of the signal rotor and the radius of the wheel (step 211).

$$V_x = a \frac{N_p}{\Delta t_s} \qquad (18)$$

Figure 20:
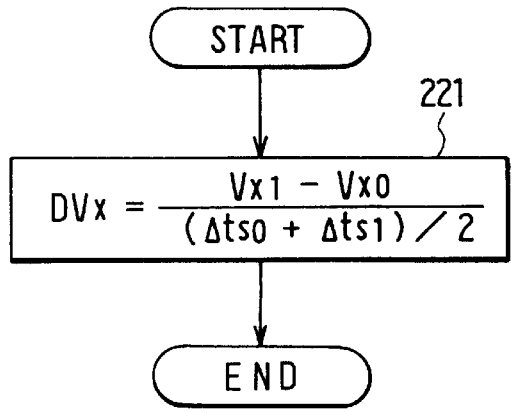
Figure 21:
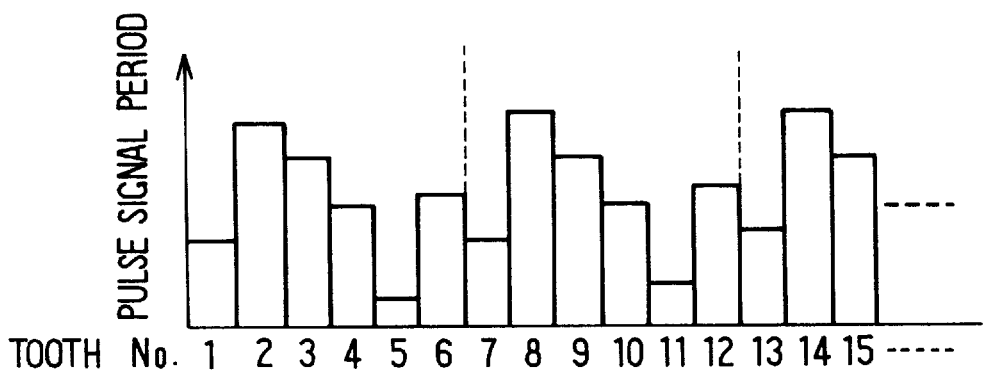
FIG. 21 is a graph showing the operation of a wheel speed sensor according to a fifth preferred embodiment of the present invention.

In step 220 following step 210 in FIG. 18, the wheel acceleration is calculated. FIG. 20 shows a flow of the wheel acceleration calculation. Wheel acceleration $DV_x$ (D denotes differential) is calculated by Equation (19) where $V_{x0}$ is the wheel speed previously calculated, $V_{x1}$ is the wheel speed calculated this time, $Dt_{s0}$ is the integrated value of the corrected pulse signal periods in the periodic interruption interval previously calculated, and $Dt_{s1}$ is the integrated value of the corrected pulse signal periods in the periodic interruption interval calculated this time (step 221).

$$DV_x = \frac{V_{x1} - V_{x0}}{\left(\frac{\Delta t_{s0} + \Delta t_{s1}}{2}\right)} \qquad (19)$$

Although the number of pulse signals of the pulse signal train is 12 in the embodiment, it can be properly set according to required updating frequency of the average S of the pulse signal periods or a reduction amount of the memory capacity. For example, when the number of pulse signals of the pulse signal train is 6, although the updating frequency of the average S of the pulse signal periods is increased, the necessary number of blocks of the memory is 48/6=8. on the contrary, the number of the pulse signals per pulse signal train is 48 which is equal to the number of teeth of the signal rotor, the updating frequency of the average S of the pulse signal periods is once per rotation of the signal rotor. However, it is unnecessary to integrate the pulse signal periods every pulse signal train, the block memory can be saved.

Fifth Embodiment

A fifth preferred embodiment of the present invention recognizes that the nonstandard factor of the signal rotor is periodic due to a factor in the method of manufacture or the like, so that the same tendency is repeated every few periods of the number of the teeth in the pulse signal periods when the vehicle actually runs. FIG. 2 shows an example of pulse signal periods actually measured. In this case, a tendency of a six-tooth period is recognized. Therefore, the average of the pulse signal periods of arbitrary successive teeth 6k (k=1, 2, . . . 7) can be regarded as the same as the average of the pulse signal periods of one rotation of the signal rotor. Although the average S of the pulse signal periods of all of the 48 teeth corresponding to one rotation of the signal rotor is used as the learning reference value when the correction coefficient is updated in the first embodiment, the average S of the pulse signal periods of a predetermined number based on the periodicity of the nonstandard factor of the signal rotor is used as a learning reference value. In the following description, the predetermined number is set to 6 on the basis of the actually measured example.

The wheel speed sensor of the embodiment has the construction basically the same as that shown in FIG. 14, and mainly software executed by the ECU 14 and the like is different. According to the embodiment, the newest six, that is the predetermined value, successive pulse signal periods $\Delta t_i$ (i=newest six sensor numbers) are stored in the block memory. In the figures, substantially the same operations are executed in steps to which the same numerals as those in FIGS. 10, 15 and 17 which were referred to in the description of the previous embodiments are designated. The different points from the fourth embodiment will be mainly described. Since the periodic interrupting process is substantially the same, the description is omitted here.

Figure 22:
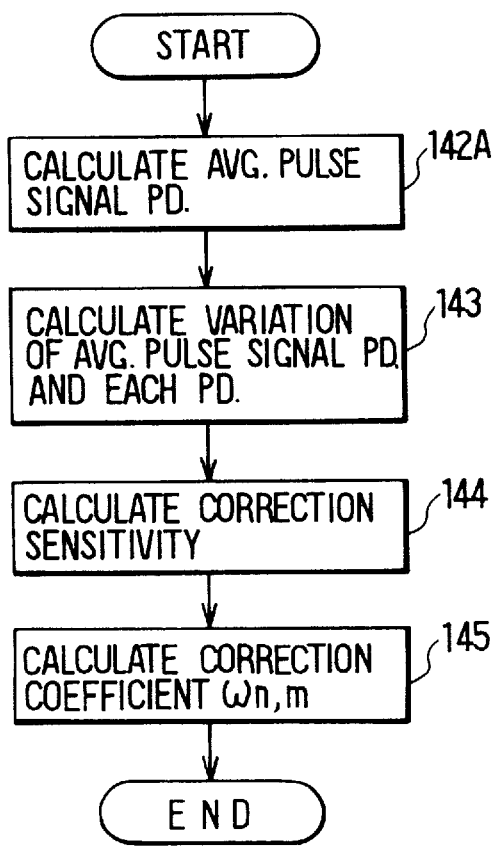
FIGS. 22 and 23 are flowcharts explaining the operation of the wheel speed sensor according to the fifth embodiment.

In step 142A in FIG. 22, the pulse signal periods $\Delta t_i$ are read out from the block memory and the average value S of the pulse signal periods $\Delta t_i$ is obtained by Equation (20).

$$S = \sum_{i=n-1}^{n-6} \frac{t_i}{6} \quad (20)$$

In subsequent steps, the correction coefficient is updated by using the average S as a learning reference value in a manner similar to the first embodiment. That is, although the learning reference value is updated once for one pulse signal train in the first embodiment, it is updated each time the pulse signal is inputted according to the present embodiment.

Figure 23:
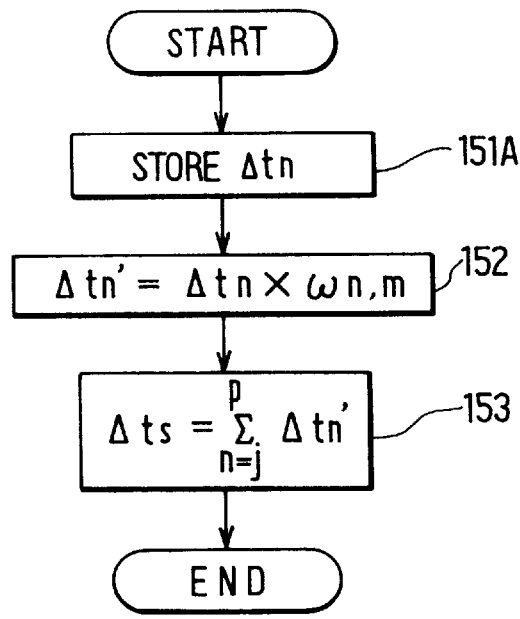

In FIG. 23, in step 151A, data of the oldest pulse signal period stored in the block memory is rewritten by data of the newest pulse signal period and the updated newest six pulse signal periods $\Delta t_i$ are stored in the block memory.

In the embodiment, the average of the pulse signal periods corresponding to one rotation of the signal rotor is represented by the average of the several pulse signal periods on the basis of the periodicity of the nonstandard factor. Therefore, the block memory does not have to store the pulse signal periods corresponding to one rotation of the signal rotor unlike the conventional technique, and it is sufficient to store a part of the pulse signal periods (according to the embodiment, 6/48=1/8). Consequently, the memory capacity can be made smaller and the costs can be reduced.

Sixth Embodiment

The wheel speed sensor of the embodiment has basically the same construction as the embodiment shown in FIG. 14, and mainly software executed by the ECU 14 and the like is different. In this embodiment, the block memory is omitted. In the Figures, substantially the same operations are executed in steps to which the same numerals as those in FIGS. 10, 15, 17 and 18 which were referred to in the description of the previous embodiments are designated. Mainly the points which are different from the first embodiment will be described.

Figure 24:
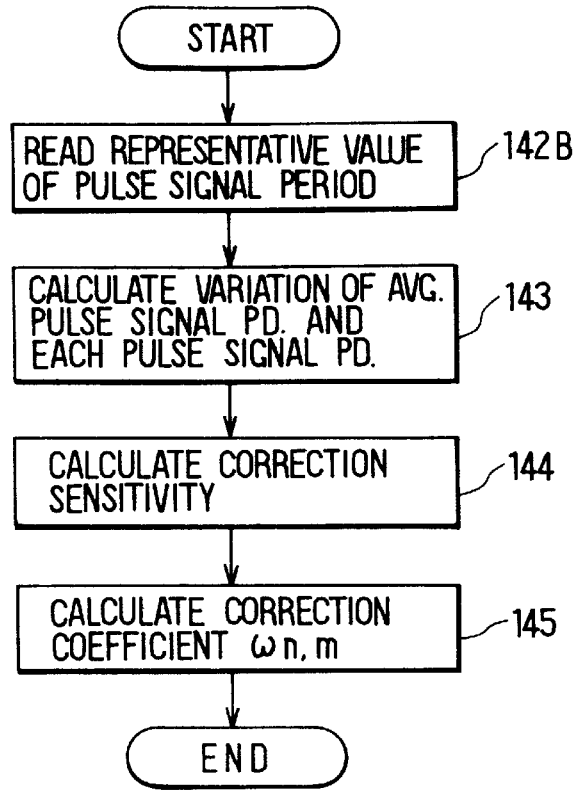
FIGS. 24–26 are flowcharts explaining operation of the wheel speed sensor according to the fifth embodiment.

In this embodiment, the learning reference value is not obtained from the pulse signal periods unlike the foregoing embodiments, and the learning reference value is obtained from the averages of the wheel speeds calculated with respect to the four wheels. In step 142B in FIG. 24, the pulse signal period representative value S as a learning reference value is read out. In the subsequent steps, the correction coefficient is updated by Equations (2) and (3) in a manner similar to the fourth embodiment.

Figure 25:
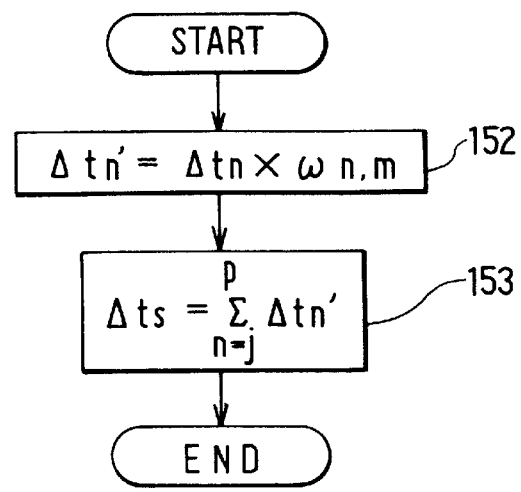

The flow of the $\Delta t_n$ correction shown in FIG. 25 is similar to that in FIG. 17 except that step 151 is omitted.

Figure 26:
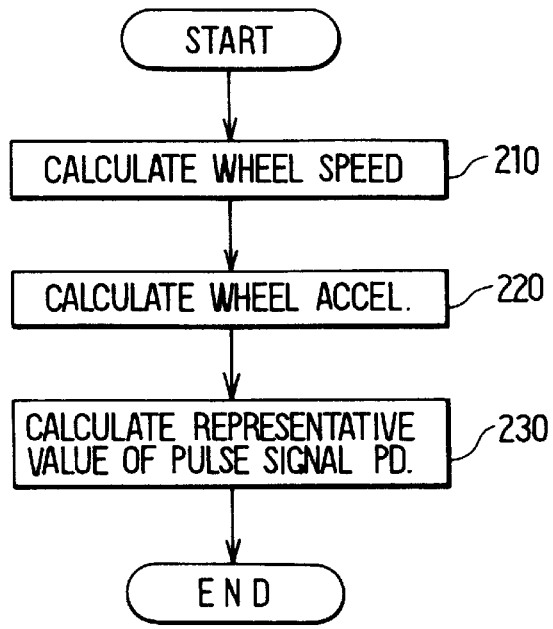

In FIG. 26, step 230 following the wheel acceleration calculation (step 220) relates to an operation of average speed calculating means and converting means. By using Equation (10), the average $V_{xav}$ of the four wheels with respect to the wheel speeds $V_x$ calculated in step 210 is calculated.

$$V_{xav} = \sum_{\substack{four \\ wheels}} \frac{V_x}{4} \quad (21)$$

Subsequently, the wheel speed average $V_{xav}$ is converted to pulse signal periods corresponding to one tooth by Equation (22), and a conversion value S is used as a pulse signal period representative value S. In the expression, (a) denotes the speed constant from Equation (7).

$$S = \frac{V_{xav}}{a} \quad (22)$$

The pulse signal period representative value S is used as the learning reference value in the subsequent interrupting processes. The wheel speeds of the four wheels are calculated from the pulse signals generated for the rotation of the independent signal rotors, respectively. The leaning reference value is repeatedly updated as mentioned above, thereby eliminating the sensing error of the pulse signal caused by the nonstandard factor from the learning reference value.

According to the embodiment, by obtaining the learning reference value from the wheel speeds calculated in the periodic interrupting process, the block memory used for updating the learning reference value can be omitted.

Seventh Embodiment

A rotational speed sensor according to a seventh preferred embodiment of the present invention has basically the construction shown in FIG. 14, and mainly software executed by the ECU 14 and the like is different. In this embodiment, the block memory is set to store the newest 48 successive pulse signal periods. In the Figures, substantially the same operations are executed in steps to which the same numerals as those in FIGS. 10, 15 and 18 which were referred to in the description of the fourth embodiment are designated. Mainly the points different from the fourth embodiment will be described. Since the periodic interrupting process is substantially the same, its description is omitted here.

The correction coefficients are allocated to the 48 rotation sensors in a one-to-one manner in the foregoing embodiments. According to the present embodiment, with respect to a plurality of pulse signal trains each consisting of a predetermined number of successive pulse signals which are 48 pulse signals of one rotation of the signal rotor, the correction coefficients of the pulse signals constituting a part of the pulse signal train are commonly used in other pulse signal trains. The predetermined number can be set based on the periodicity of the nonstandard factor of the signal rotor as mentioned in the second embodiment. It is also possible that the highest degree to be eliminated in the rotation of the signal rotor is used as the number of the pulse signal trains corresponding to one rotation of the signal rotor and the number of the pulse signals per pulse signal train is converted by the highest degree. It is unnecessary to eliminate noise components higher than a frequency band as a target in analysis of the wheel speed. In a manner similar to the second embodiment, the present embodiment will be described by setting the predetermined number to 6.

As correction coefficients, six correction coefficients $\omega_{r,m}$ (r=1, 2, ... 6) are set. The correction coefficients $\omega_{r,m}$ correspond to pulse signals in which the remainder is (r) when the rotation sensor number (n) is related to 6. For example, with respect to each of the pulse signals in which n=1, 7, 13, ... the correction coefficient is $\omega_{1,m}$. That is, the pulse signal train consisting of six successive pulse signals commonly uses a set of the correction coefficients $\{\omega_{r,m}$ (r=1–6)$\}$ with other pulse signal trains.

If the updating of the correction coefficient $\omega_{r,m}$ is permitted (corresponding to step 1300 of FIG. 10), the processing routine advances to step 1400 (it should be noted that FIGS. 10, 22 and 23 use "n" as a subscript, rather than "r"). Corresponding to step 142A in FIG. 22, the pulse signal periods $\Delta t_k$ (k=n−48, n−47, ..., n−2, n−1) are read out from the block memory, and the average S of the pulse signal periods $\Delta t_n$ is obtained by Equation (23) and is used as a learning reference value.

$$S = \sum_{k=n-1}^{n-48} \frac{t_k}{48} \quad (23)$$

The following step, corresponding to step 143 in FIG. 22, relates to an operation as deviation dependent calculating means and the deviation dependent value $\Delta t_h$ is calculated by Equation (24).

$$\Delta t_h = \frac{S - \omega_{r,m-1} \cdot \Delta t_n}{S} \quad (24)$$

That is, the deviation of the pulse signal period $\Delta t_n$ of each rotation sensor which is corrected by the previous correction coefficient $\omega_{r,m-1}$ from the pulse signal period average S is calculated (refer to the numerator in the Equation (24)), and the deviation is standardized by the average S of the pulse signal periods in order to eliminate the speed dependency of the deviation.

Next, corresponding to step 144 of FIG. 22, by multiplying the correction sensitivity coefficient k that adjusts the convergence speed of the correction coefficient $\omega_{r,m}$ with $\Delta t_h$ (k$\Delta t_h$), the degree of influence of $\Delta t_h$ exerted on the correction coefficient $\omega_{r,m}$ for one pulse signal input is adjusted.

Corresponding to step 145 of FIG. 22, the correction coefficient $\omega_{r,m}$ is updated according to Equation (25) by using the value k$\Delta t_h$ obtained by adjusting the deviation dependent value $\Delta t_h$ by the correction sensitivity coefficient k. That is, k$\Delta t_h$ is added to the previous correction coefficient $\omega_{r,m-1}$ of each rotation sensor.

$$\omega_{r,m} = \omega_{r,m-1} + k\Delta t_h \quad (25)$$

Corresponding to step 151A of FIG. 23, data of the oldest pulse signal period in the block memory is rewritten by the newest pulse signal period measured in step 110 (see FIG. 10).

Corresponding to step 152 of FIG. 23, the pulse signal period $\Delta t_n$ is corrected with Equation (26), thereby eliminating the error caused by the nonstandard factor of the signal rotor. In the expression, $Dt_n'$ denotes the corrected pulse signal period.

$$\Delta t_n' = \Delta t_n \cdot \omega_{r,m} \quad (26)$$

According to the embodiment, the pulse signal train uses the set of the correction coefficients commonly with other pulse signal trains, thereby enabling the capacity of the memory storing the correction coefficients to be remarkably reduced as compared with the case of allocating the correction coefficients to all of the rotation sensors in a one-to-one manner of the conventional technique. According to the embodiment, for example, since the set of the correction coefficients consists of six correction coefficients, only one eighth (=6/48) is necessary. The capacity of the memory may be largely reduced by reducing the capacity of the block memory by combining the embodiment with any of the first to third embodiments.

Eighth Embodiment

The rotational speed sensor according to an eighth preferred embodiment has basically the same construction as that shown in FIG. 14 and mainly software executed by the ECU 14 and the like is different. According to the embodiment, the block memory is set to store the newest 48 successive pulse signal periods. The speed pulse interrupting process according to this embodiment generally conforms to the flow shown in FIG. 10.

In the periodic interrupting process, the average of the wheel speeds $V_x$ is calculated and is compared with a preset threshold. If the average is larger than the threshold, high speed is discriminated and the speed pulse interrupting process is switched to a high-speed mode. Others are substantially the same as those in the periodic interrupting process of each of the foregoing embodiments, so that the description thereof is omitted.

Figure 27:
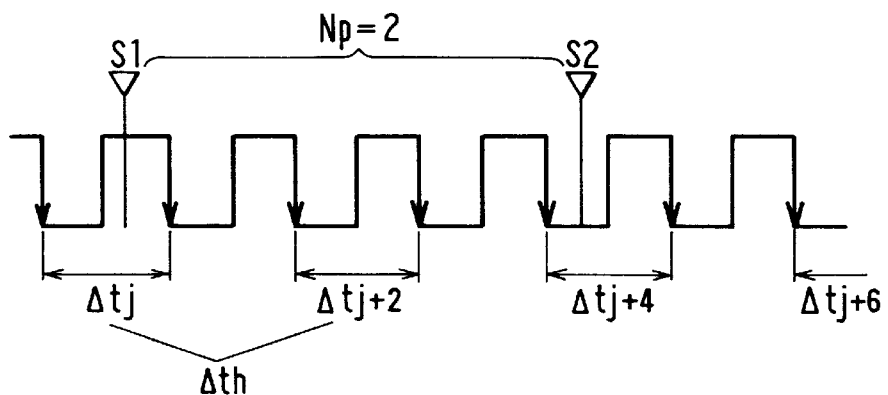
FIGS. 27 and 28 are graphs illustrating the operation of the wheel speed sensor according to and eighth preferred embodiment of the present invention.

FIG. 27 shows a state of the pulse signals. As the wheel speed becomes high, the pulse signal period becomes short and the calculation load on the ECU 14 increases. In the embodiment, every other pulse signal is ignored at the time of high speed. In the example of the diagram, the pulse signal periods $\Delta t_i$, $\Delta t_{i+2}$, $\Delta t_{i+4}$, ... are effectively used for the calculation of the wheel speed and the pulse signal periods $\Delta t_{i+1}$, $\Delta t_{i+3}$, and $\Delta t_{i+5}$ are ignored. The number $N_p$ of the input pulse signals in the periodic interruption interval is counted on the basis of the effective pulse signals. In the example of the diagram, $N_p$=2. As mentioned above, the calculation load on the ECU 14 is lightened.

In step 1200 in FIG. 10, the rotation sensor numbers are designated to the pulse signals, and whether the designated rotation sensor number is even or odd is discriminated. In case of a preset even or odd number, for example, in case of the odd number, the processing routine does not advance to step 130 and instead the speed pulse interrupting process is finished. That is, every other pulse signal is ignored, so that the 24 pulse signals which are every other signals of the 48 pulse signals generated in one rotation of the signal rotor are effectively used to calculate the wheel speed.

At the time of low speed when the wheel speed does not exceed the threshold value, the calculation is executed by setting the number of teeth of the signal rotor 12 to 48.

According to the invention, since the number of the rotation sensors of the signal rotor can be actually set to half at the time of high speed, the calculation load on the ECU is reduced by half. Consequently, high processing ability is unnecessary for the ECU, so that the costs of the apparatus can be reduced. By combining with any of the foregoing embodiments, the capacity of the memory can be largely reduced.

Although the present invention has been fully described in connection with the preferred embodiments thereof with reference to the accompanying drawings, it is to be noted that various changes and modifications will become apparent to those skilled in the art.

Figure 28:
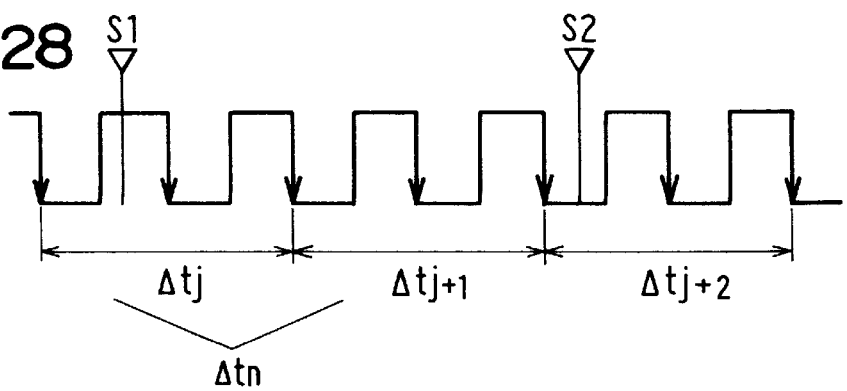

For example, although the 24 pulse signals which are every other signal of the 48 pulse signals generated for one rotation of the signal rotor are effectively used in the embodiment, as shown in FIG. 28, the period of the pulse signal train consisting of a plurality (2, for example) of successive pulse signals can be used in place of the pulse signal period. In this case, step 1100 in FIG. 10 is set to measure the period of the pulse signal train and the speed constant (a) in Equation (18) is changed to ½ of the value at the time of the low speed in the calculation of the wheel speed in the periodic interrupting process.

Although it is set in such a manner that the wheel speed is discriminated as either high or low value and the number of effective pulse signals is changed to half at the time of high speed, the wheel speed can be further broken down minutely and the number of effective pulse signals can be reduced step by step like ½, ⅓, . . . of the number of pulse signals corresponding to one rotation of the signal rotor. In the apparatus applied to sense the speed in the high speed range, the switch according to speed is not executed and the apparatus can be operated always in the high speed mode. In this case, it is sufficient to set the number of effective pulse signals in accordance with the speed range of the rotor to be measured, so that the calculation load on the ECU can be reduced and the signal rotor can be used as a standard part.

The embodiment can be performed in combination with any of the other embodiments.

Although the foregoing embodiments show examples of applying the invention to the operation for sensing the wheel speed of the vehicle, the invention can be also applied to any apparatus for sensing speed of a rotor which is installed at a position receiving vibration or the like.

Such changes and modifications are to be understood as being included within the scope of the present invention as defined by the appended claims.

What is claimed is:

1. A tire abnormality sensor comprising:
    a rotor for rotating integrally with a wheel and in which a plurality of rotation elements are formed in a circumferential direction thereof;
    rotation sensing means for facing the rotor and sensing passage of each of the rotation elements of the rotor;
    deviation dependent value calculating means for calculating a deviation dependent value which is dependent on a deviation in sensing periods of sensing signals produced by the rotation sensing means from a reference value;
    characteristic variable calculating means for calculating a characteristic variable showing characteristics of the deviation dependent value; and
    discriminating means for discriminating between two tire states on the basis of the characteristic variable calculated by the characteristic variable calculating means.

2. The tire abnormality sensor according to claim 1, wherein the characteristic variable is a variation amount in the deviation dependent values in one rotation of the rotor.

3. The tire abnormality sensor according to claim 1, wherein the characteristic variable is an aging change amount in the deviation amount dependent value.

4. The tire abnormality sensor according to claim 1, wherein the discriminating means is for comparing the difference in the characteristic variables with a predetermined value between wheels.

5. The tire abnormality sensor according to claim 1, wherein the discriminating means is for comparing the difference between the characteristic variables of a present time and a previous time with a predetermined value.

6. The tire abnormality sensor according to claim 1, wherein the discriminating means is for comparing the difference between the characteristic variable of a present time and a preset initial value of the characteristic variable with a predetermined value.

7. The tire abnormality sensor according to claim 6, wherein the initial value of the characteristic variable is a value calculated by the characteristic variable calculating means at a tire normal time, and the discriminating means has storing means for storing the calculated value.

* * * * *